US010911199B2

(12) United States Patent
Yu et al.

(10) Patent No.: US 10,911,199 B2
(45) Date of Patent: Feb. 2, 2021

(54) METHODS AND DEVICES FOR MULTI-BEAM BEAMSWEEPING

(71) Applicant: Intel Corporation, Santa Clara, CA (US)

(72) Inventors: Zhibin Yu, Unterhaching (DE); Bertram Gunzelmann, Koenigsbrunn (DE); Yeong-Sun Hwang, Oberhaching (DE); Andre Janssen, Munich (DE); Holger Neuhaus, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 4 days.

(21) Appl. No.: 16/441,002

(22) Filed: Jun. 14, 2019

(65) Prior Publication Data

US 2020/0396035 A1    Dec. 17, 2020

(51) Int. Cl.
| | |
|---|---|
| *H04W 72/04* | (2009.01) |
| *H04L 5/00* | (2006.01) |
| *H04W 72/14* | (2009.01) |
| *H04W 72/12* | (2009.01) |

(52) U.S. Cl.
CPC ......... *H04L 5/0048* (2013.01); *H04W 72/046* (2013.01); *H04W 72/1284* (2013.01); *H04W 72/14* (2013.01)

(58) Field of Classification Search
CPC ........... H04W 72/042; H04W 72/1284; H04W 72/14
See application file for complete search history.

(56) References Cited

U.S. PATENT DOCUMENTS

| | | | |
|---|---|---|---|
| 10,277,349 B1 | 4/2019 | Kotecha et al. | |
| 10,784,910 B1 * | 9/2020 | Chang | H04L 5/0062 |
| 2008/0130674 A1 * | 6/2008 | Ahmed-Ouameur | H04L 25/0204 370/441 |
| 2012/0015603 A1 * | 1/2012 | Proctor, Jr. | H04B 7/0874 455/9 |

(Continued)

FOREIGN PATENT DOCUMENTS

| | | |
|---|---|---|
| WO | 2017065548 A1 | 4/2017 |
| WO | 2017091137 A1 | 6/2017 |

OTHER PUBLICATIONS

International Search Report for related application No. PCT/CN/2017/119942, dated Oct. 8, 2018, 4 pages (for informational purpose only).

(Continued)

*Primary Examiner* — Chi Ho A Lee
(74) *Attorney, Agent, or Firm* — Viering, Jentschura & Partner MBB

(57) ABSTRACT

A wireless device includes a digital receiver configured to receive data via an antenna array, and to determine a load metric based on a load of subcarriers around reference subcarrier signals of a reference signal, and a controller configured to compare the load metric to a load threshold to determine whether the load of the subcarriers is less than a predefined level, and if the load of the subcarriers is less than the predefined level, identify at least one time point where the reference signal repeats itself during a symbol period, and control the antenna array to switch among the plurality of antenna beamforming patterns based on the at least one time point.

25 Claims, 20 Drawing Sheets

(56) References Cited

U.S. PATENT DOCUMENTS

| | | | |
|---|---|---|---|
| 2013/0157710 A1* | 6/2013 | Nammi | H04W 36/18 |
| | | | 455/525 |
| 2013/0294488 A1* | 11/2013 | Pan | H04B 7/0486 |
| | | | 375/219 |
| 2013/0343440 A1* | 12/2013 | Negus | H01Q 21/28 |
| | | | 375/219 |
| 2016/0294462 A1 | 10/2016 | Jeong et al. | |
| 2016/0337016 A1* | 11/2016 | Capar | H04W 16/28 |
| 2017/0124364 A1* | 5/2017 | Villar | G06K 7/10376 |
| 2017/0264415 A1 | 9/2017 | Wiberg et al. | |
| 2017/0279506 A1* | 9/2017 | Shattil | H04L 27/01 |
| 2018/0007679 A1 | 1/2018 | Lee et al. | |
| 2018/0191065 A1 | 7/2018 | Ma | |
| 2018/0302141 A1* | 10/2018 | Kutz | H04B 7/0634 |
| 2019/0013988 A1* | 1/2019 | Dudzinski | H04L 27/2659 |
| 2020/0186230 A1* | 6/2020 | Solichien | H04B 7/0626 |

OTHER PUBLICATIONS

International Search Report issued for the corresponding PCT application No. PCT/US2020/031973, dated Sep. 28, 2020, 14 pages (for informational purpose only).

\* cited by examiner

FIG 16
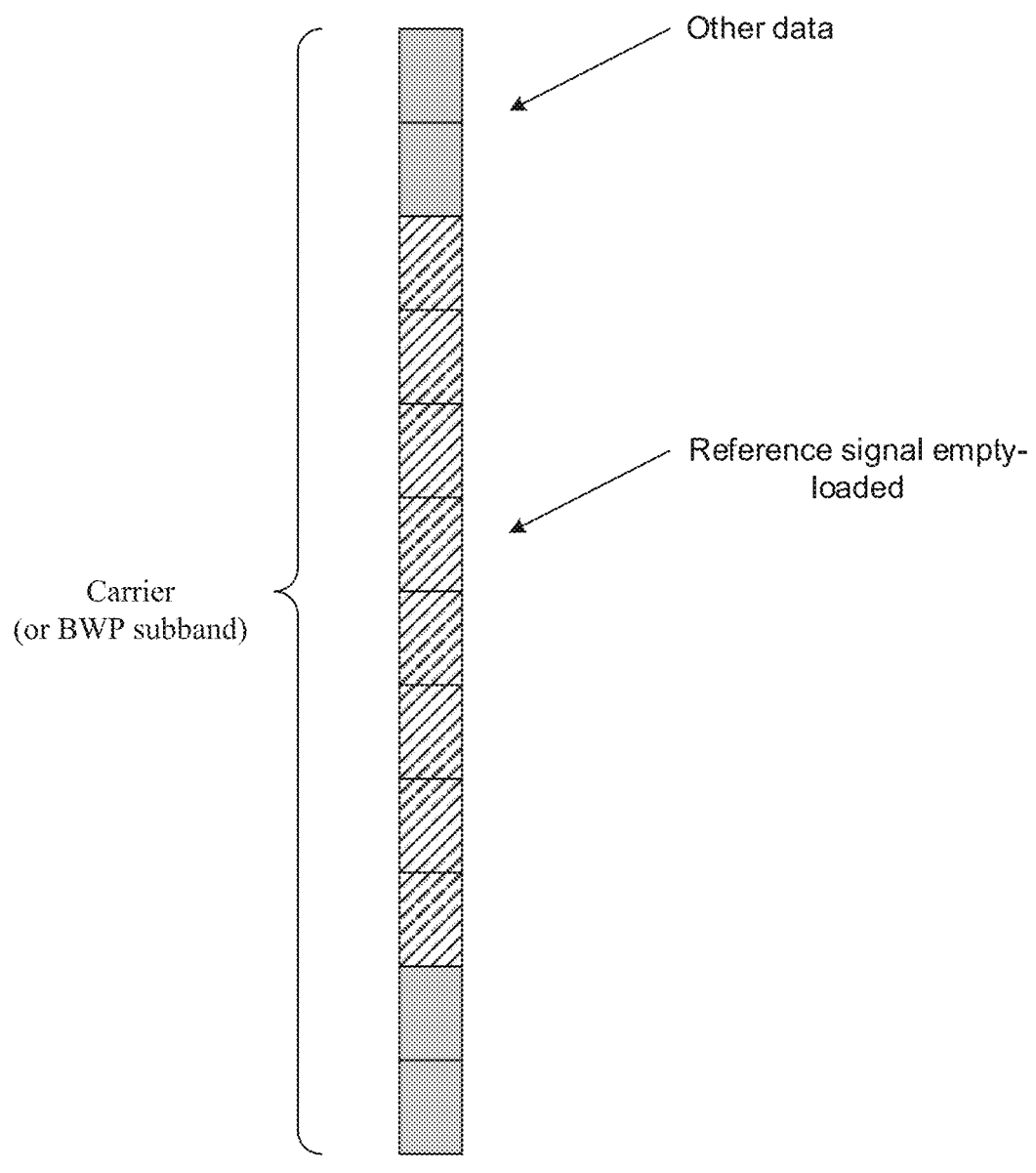
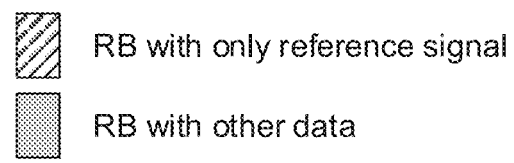

METHODS AND DEVICES FOR MULTI-BEAM BEAMSWEEPING

TECHNICAL FIELD

Various embodiments relate generally to methods and device for performing multi-beam beamsweeping.

BACKGROUND

Radio access technologies such as WiGiG and Fifth Generation (5G) New Radio (NR) use beamforming to compensate for the higher pathloss at high frequency carriers. To implement beamforming, a device may apply different weights to different elements of antenna array. When the device wirelessly transmits with that antenna array, the resulting radio signals form a radiation pattern of constructive and destructive interference. By adjusting the weights, the device may therefore steer its antenna radiation pattern in specific directions, such as in the direction of a target device. Devices can also use beamforming in the receive direction with a similar technique. For example, a device may receive with an antenna array, apply different weights to the signals received by the different elements, and then combine the weighted signals. Depending on the weights at each element, the resulting combined signal will be more sensitive in certain directions around the device. Like in the transmit case, the device can therefore steer its antenna radiation pattern to receive signals in a certain direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 16 shows an example according to some aspects when part of a carrier contains an empty-loaded reference signal that suffers from ICI from other signals on the edges of the carrier according to some aspects.

DESCRIPTION

Figure 1:
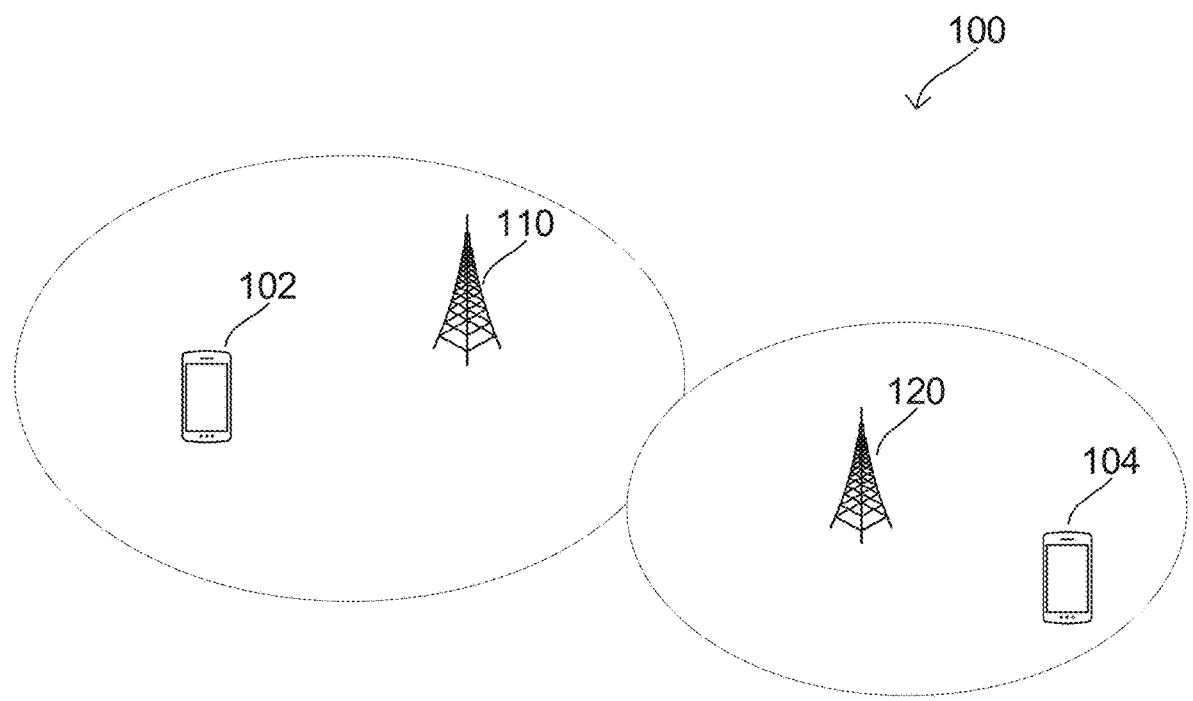
FIG. 1 shows an exemplary radio communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or bodymounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Many wireless communication technologies use beamforming to improve link sensitivity. However, identifying a proper beam is often a time-consuming procedure. For example, a receive device may receive reference signals from a transmit device, and may perform measurements on the reference signals with its antenna array set to different antenna beamforming patterns. Once the receive device identifies an antenna beamforming pattern that yielded a strong measurement, the receive device selects that antenna beamforming pattern and uses it to receive signals from the transmit device. Performing a measurement for each antenna beamforming patterns, however, may take time. If the beamsweeping procedure takes too long, the receive device may go for long periods without having a proper beam selected. This may degrade link sensitivity and hurt performance.

Various aspects of this disclosure provide methods and devices to speed up the beamsweeping procedure. To do so, a device may test multiple antenna beamforming patterns during a single symbol period of the reference signal. Because these measurements are susceptible to inter-carrier interference (ICI), the device may first determine whether the subcarriers adjacent to the reference signal have low load. If so, the device may identify time points where the reference signal repeats itself during the duration of a symbol period. The device may then time the switching among the multiple antenna beamforming patterns to align with the time points. Because the reference signal forms identical (meaning, for example, actually identical or substantially similar) repetitions within a symbol period when there is no ICI, the device may perform the measurement for each antenna beamforming pattern on an identical repetition of the reference signal. The device may therefore be able to test multiple antenna beamforming patterns during a single symbol period without sacrificing measurement accuracy. This may thus reduce the beamsweeping time while still maintaining high accuracy. Some aspects may also implement these techniques for transmit beamforming, where a transmit device detects low load and then transmits while switching among the multiple beamforming patterns based on the time points where the reference signal repeats itself.

Figure 2:
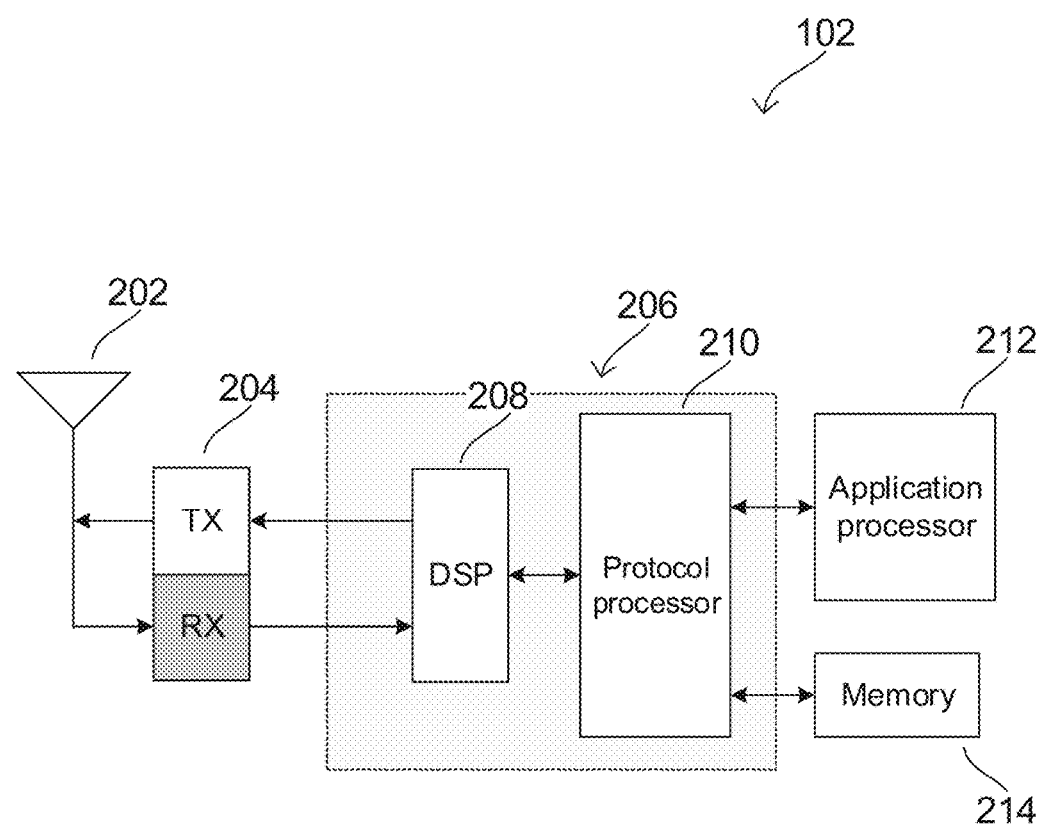
FIG. 2 shows an exemplary internal configuration of a terminal device according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Many emerging communication technologies use beamforming techniques to improve communication performance. These beamforming techniques operate by adjusting the phase of antennas in an array to produce radiation patterns of constructive and destructive interference. By shaping and steering these radiation patterns, radio communication devices can achieve high beamforming gains, which can in turn improve radio communication reliability and performance. This can be particularly beneficial in radio communication technologies that operate at high frequencies, such as millimeter wave (mmWave) technologies. Because these radio technologies may operate at carrier frequencies of 30 GHz and above, beamforming gains can be extremely helpful in compensating for the high pathloss often experienced at carrier frequencies in these ranges.

Figure 3A:
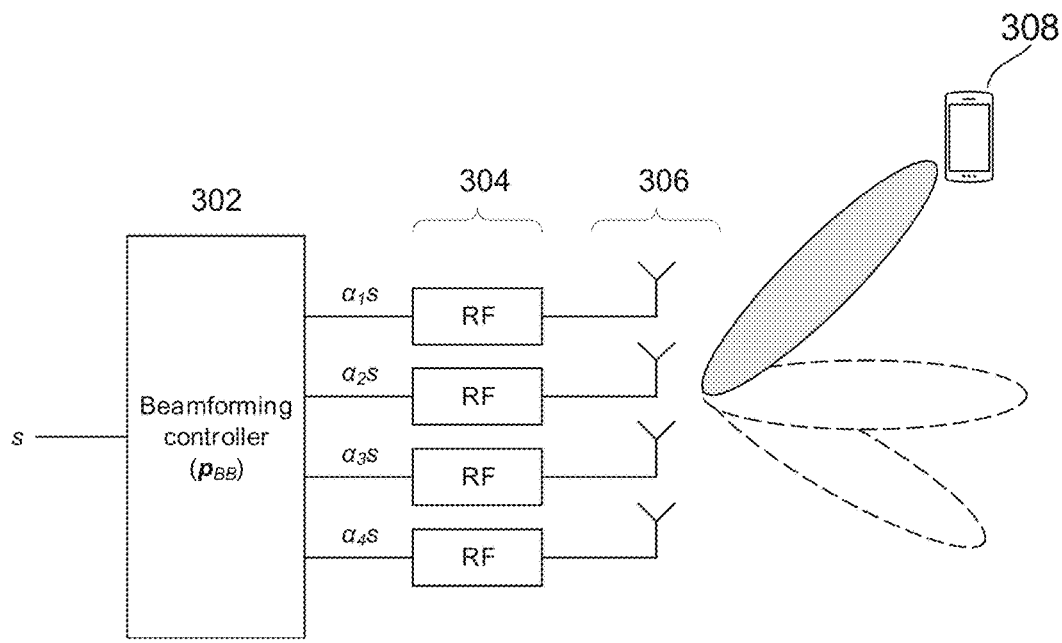
FIGS. 3A and 3B show exemplary configurations of digital and RF beamforming according to some aspects.
Figure 3B:
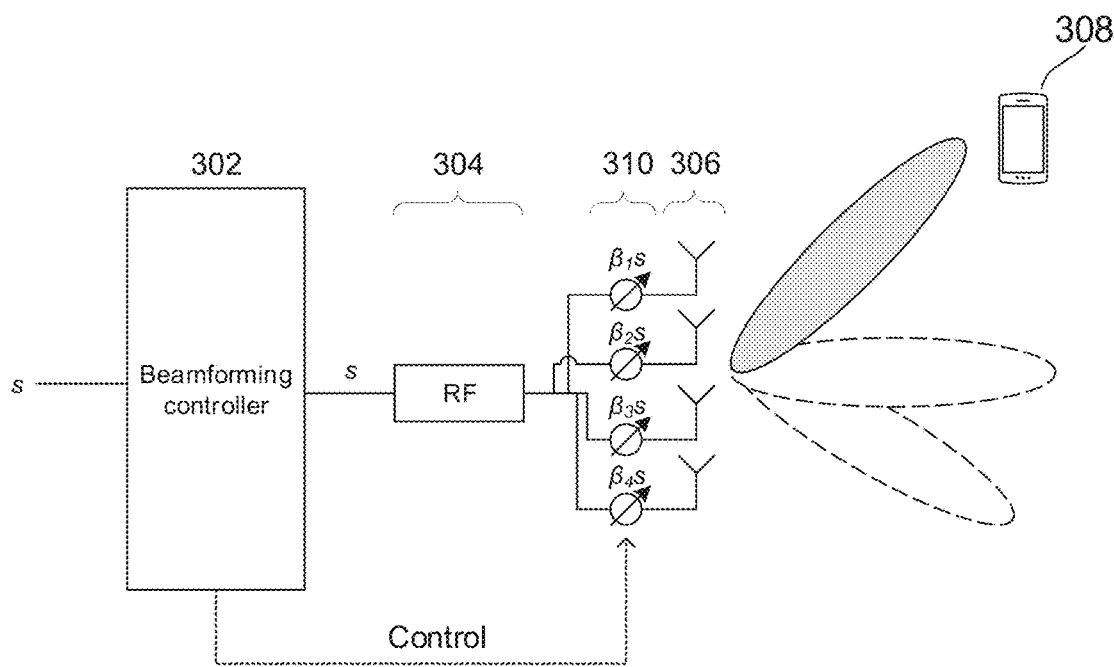

Beamforming systems may perform processing in one or both of the baseband and RF domains to shape antenna array beam patterns. FIGS. 3A and 3B show two simplified beamforming approaches as deployed for an exemplary four-element antenna array. Although the following description may focus on a beamforming in the transmit direction, skilled persons can also apply analogous beamforming techniques to achieve beamforming gains in the receive direction.

FIG. 3A illustrates a simplified digital baseband beamforming architecture that digitally applies complex beamforming weights (composed of both a gain and phase factor) in the baseband domain. As shown in FIG. 3A, beamforming controller 302 may receive baseband symbol s and subsequently apply a complex weight vector $p_{BB}=[\alpha_1\ \alpha_2\ \alpha_3\ \alpha_4]^T$ to s to generate $p_{BB}s$, where each element $\alpha_i$, i=1, 2, 3, 4 is a complex weight (comprising a gain factor and phase shift). Each resulting element $[\alpha_1 s\ \alpha_2 s\ \alpha_3 s\ \alpha_4 s]^T$ of $p_{BB}s$ may be baseband symbol s multiplied by some complex weight $\alpha_i$. Beamforming controller 302 may then map each element of $p_{BB}s$ to a respective RF chain of RF system 304, which may each perform digital to analog conversion (DAC), radio carrier modulation, and amplification on the received weighted symbols before providing the resulting RF symbols to a respective element of antenna array 306. Antenna array 306 may then wirelessly transmit each RF symbol. This exemplary model can also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}s=[\alpha_1 s\ \alpha_2 s\ \alpha_3 s\ \alpha_4 s]^T$. Thus, after multiplying $p_{BB}$ and s, the overall dimension is the same as the overall dimension at the output of beamforming controller 302. The below descriptions thus refer to beamforming controller 302 as $p_{BB}$ and transmit symbol/vector as s for this reason while this model can be extended to further dimensions as explained.

By manipulating the beamforming weights of $p_{BB}$, beamforming controller 302 may be able to utilize each of the four antenna elements of antenna array 306 to produce a steered beam (antenna beamforming pattern) that has greater beam gain than a single antenna element. The radio signals emitted by each element of antenna array 306 may combine to realize a combined waveform that exhibits a pattern of constructive and destructive interference that varies over distances and direction from antenna array 306. Depending on a number of factors (such as antenna array spacing and alignment, radiation patterns, carrier frequency, and the like), the various points of constructive and destructive interference of the combined waveform can create a focused beam lobe that can be "steered" in direction via adjustment of the phase and gain factors $\alpha_i$ of $p_{BB}$. FIG. 3A shows several exemplary steered beams generated by antenna array 306, which beamforming controller 302 may control by adjusting $p_{BB}$. Although only steerable main lobes are depicted in the simplified illustration of FIG. 3A, beamforming controller 302 may be able to comprehensively "form" the overall beam pattern including nulls and sidelobes through similar adjustment of $p_{BB}$.

Beamforming controller 302 may also perform adaptive beamforming, where beamforming controller 302 dynamically changes the beamforming weights in order to adjust the direction and strength of the main lobe in addition to nulls and sidelobes. With these adaptive approaches, beamforming controller 302 can steer the beam in different directions over time, which may be useful to track the location of a moving target point (e.g. a moving receiver or transmitter). In a radio communication context, beamforming controller 302 may identify the location of a target terminal device 308 (e.g. the direction or angle of terminal device 308 relative to antenna array 306) and subsequently adjust $p_{BB}$ in order to generate a beam pattern with a main lobe pointing towards terminal device 308, thus improving the array gain at terminal device 308 and consequently improving the receiver performance. Through adaptive beamforming, beamforming controller 302 may be able to dynamically adjust or "steer" the beam pattern as terminal device 308 moves in order to continuously provide focused transmissions to terminal device 308 (or conversely focused reception).

In some aspects, beamforming controller 302 may be implemented as a microprocessor. Beamforming controller 302 therefore may be able to exercise a high degree of control over both gain and phase adjustments of $p_{BB}$ with digital processing. However, as shown in FIG. 3A for RF system 304 and antenna array 306, digital beamforming configurations may use a dedicated RF chain for each element of antenna array 306 (where each RF chain performs radio processing on a separate weighted symbol $\alpha_i$s provided by beamforming controller 302); i.e. $N_{RF}=N$ where $N_{RF}$ is the number of RF chains and N is the number of antenna elements. Because there may be a complex assortment of circuitry in each RF chain (DAC, amplification, mixing, etc.), these digital beamforming approaches can be expensive and power-inefficient. These issues may be worsened as the involved number of antennas increases, which may be particularly problematic for the massive antenna arrays targeted for next-generation technologies that will include tens or even hundreds of antenna elements.

Contrasting with the beamforming controller architecture of FIG. 3A, FIG. 3B shows an RF beamforming approach. As shown in FIG. 3B, beamforming controller 302 may provide baseband symbol s to RF transceiver 304. RF transceiver 304 may perform RF transmit processing on baseband symbol s and provide the resulting symbol s to each of phase shifters 310. In the example shown in FIG. 3B, phase shifters 310 may include four phase shifters 310 that each apply a respective phase shift $\beta_1$ to $\beta_4$ to s. In some aspects, phase shifters 310 may be analog RF phase shifters that apply their respective phase shifts in the analog RF domain. Phase shifters 310 may provide the resulting phase-shifted symbols $\beta_1$s to $\beta_4$s to antenna array 306. The respective antennas of antenna array 306 may wirelessly transmit the phase-shifted symbols. Similar to the operation of FIG. 3A's digital beamformer, FIG. 3B's RF beamformer may realize a specific antenna beamforming pattern by selecting the phase weights $\beta_1$ to $\beta_4$.

Accordingly, beamforming controller 302 may be configured to select phase weights $\beta_1$ to $\beta_4$, such as based on the direction of terminal device 308, and provide the phase weights to $\beta_1$ to $\beta_4$ to phase shifters 310 (with the "Control" line shown in FIG. 3B). Beamforming controller 302 may therefore steer the main antenna beam towards terminal device 308 through proper selection of the phase weights $\beta_1$ to $\beta_4$. In some cases, the phase weights may be phase-only (e.g., only a phase shift with no amplitude change); in other aspects, the phase weights may have a phase and a gain component (e.g., a phase shift and an amplitude gain).

As introduced above, transmit and receive devices may use beamforming to increase transmission or reception sensitivity in certain directions. To do this, a device may select a set of beamforming weights and apply those beamforming weights to the elements of its antenna array. This may create a unique antenna beamforming pattern that transmits or receives signals with different sensitivity in different directions.

Wireless communication technologies like 5G NR and WiGig may use beamforming to increase link strength between terminal devices and network access nodes. Wireless devices may use this beamforming in both the transmit and receive directions. For example, a terminal device may use receive beamforming by configuring its antenna array to receive with a specific antenna beamforming pattern that is steered towards a target network access node. Similarly, in a transmit example, a terminal device may configure its antenna array to transmit signals with a specific antenna beamforming pattern steered towards a target network access node. Network access nodes may perform transmit and receive beamforming in the same manner. While this disclosure may describe examples using receive beamforming, this disclosure also covers those same examples using transmit beamforming.

Figure 4:
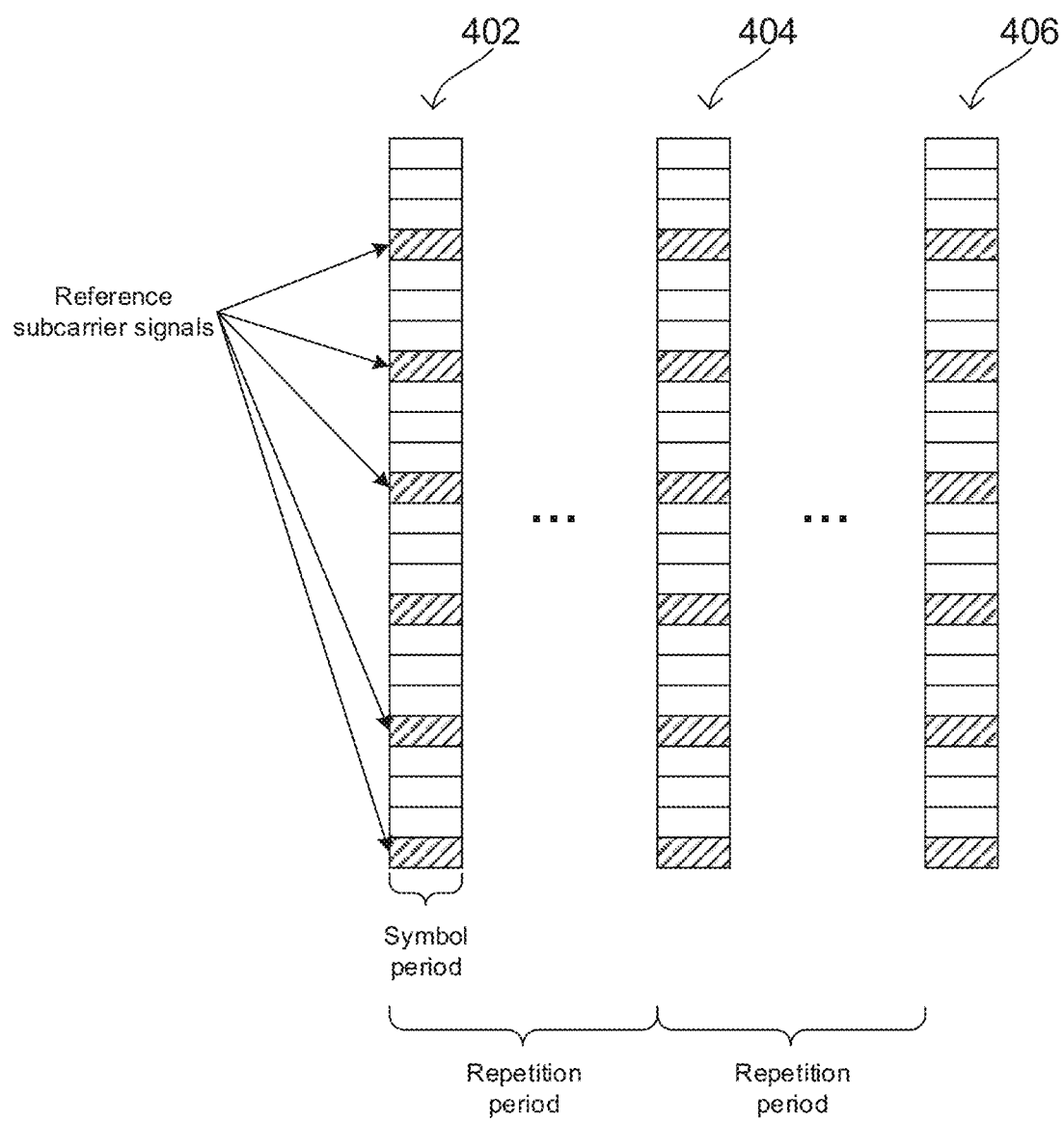
FIG. 4 shows an exemplary scheduling pattern of a reference signal according to some aspects.

Because there are many possible sets of beamforming weights, a device may be able to select from many different antenna beamforming patterns when it receives from a target device. Since there are many options, the device may use a beamsweeping procedure to select an appropriate antenna beamforming pattern, e.g., an antenna beamforming pattern that steers the device's antenna array in the direction of the target device. In an exemplary beamsweeping procedure, a transmit device may transmit a reference signal to a receive device (e.g., using an omnidirectional antenna beamforming pattern). The receive device may then receive the reference signal with a first antenna beamforming pattern and obtain a first measurement. The transmit device may continue to transmit the reference signal, such as by periodically or intermittently transmitting the reference signal in each of a sequence of reference signal sentences. The receive device may then receive the reference signal (e.g., in a later reference signal instance) with a second antenna beamforming pattern and obtain a second measurement. The receive device may test a plurality of the antenna beamforming patterns by obtaining a measurement for each. After obtaining the measurements, the receive device may determine which antenna beamforming pattern yielded the strongest measurement (e.g., a highest signal strength measurement). The receive device may then select that antenna beamforming pattern and use it to receive data signals from the transmit device. The receive device may repeat the beamsweeping procedure over time, and in doing so repeatedly updates the antenna beamforming pattern so that it tracks the transmit device as they move. Devices may also use beamsweeping for transmit beamforming, such as where a transmit device transmits a reference signal with different antenna beamforming patterns and a receive device reports back which antenna beamforming pattern produced the highest signal radio measurement at its end. FIG. 4 shows an example of reference signals that devices can use for beamsweeping according to some aspects. A network access node may transmit symbols on each of a plurality of subcarriers. Each of the symbol periods on each of the subcarriers form a resource grid of resource elements (REs), where each RE is a time-frequency resource equal to a single symbol period on a single subcarrier. The network access node may transmit a reference signal by transmitting reference symbols of the reference signal on certain subcarriers during specific symbol periods. The network access node may transmit a reference signal over a plurality of reference signal instances, where each instance is one (e.g., CSI-RS or SRS) or more (e.g., SSB) contiguous symbol periods that carry reference symbols of the reference signal. For example, FIG. 4 shows reference signal instances 402, 404, and 406. In some aspects, the reference signal may be periodic in time, meaning that the reference signal instances are separated by a fixed repetition period. The signal on one reference subcarrier during a reference signal instance is referred to here as a reference subcarrier signal. If a reference signal instance is one symbol period, for example, a reference subcarrier signal refers to the reference symbols on one reference subcarrier for the one symbol period of the reference signal instance. If a reference signal instance is four symbol period, for example, a reference subcarrier signal refers to the reference symbols on one reference subcarrier for the four symbol periods of the reference signal instance. The reference symbols of each reference subcarrier signals may be predefined (e.g., based on a Zadoff-Chu sequence), and a receive device may perform measurements by receiving the reference subcarrier signals and evaluating them based on, for example, signal power. In the example of FIG. 4, the reference subcarrier signals may be separated by one or more subcarriers (e.g., spaced evenly or irregularly according to a predefined spacing pattern). The adjacent subcarriers may carry other reference signals (e.g., for other terminal devices).

In some cases, a receive device may measure an antenna beamforming pattern by setting its antenna array to that antenna beamforming pattern and receiving the reference signal over a single symbol period. The receive device may then perform a radio measurement on the reference subcarrier signals in that single symbol period. The received device can then use the radio measurement to evaluate the antenna beamforming pattern, such as by comparing the radio measurement to those of other antenna beamforming patterns and then selecting the antenna beamforming pattern with the best radio measurement. Using the example of FIG. 4, a terminal device may set its antenna array to a first antenna beamforming pattern and receive the reference signal during reference signal instance 402, which occupies a full symbol period. The terminal device may then process the reference symbols (on the assigned subcarriers) in the symbol period of reference signal instance 402 to obtain a first radio measurement for the first antenna beamforming pattern. The terminal device may then set its antenna array to a second antenna beamforming pattern and receive the reference signal during reference signal instance 404. The terminal device may then process the reference symbols in the symbol period of reference signal instance 404 to obtain a second radio measurement for the second antenna beamforming pattern. The terminal device may repeat this for a third antenna beamforming pattern to obtain a third radio measurement, and so forth until the terminal device obtains radio measurements for each of a plurality of antenna beamforming patterns that it is testing in the beamsweeping procedure. The terminal device can select the antenna beamforming pattern with the highest radio measurement and then use that antenna beamforming pattern to receive from the network access node.

Many radio communication technologies use this type of beamsweeping procedure as part of their beamforming features. 3GPP's 5G NR, for example, uses beam management (BM) to provide antenna array-based analog beamforming (e.g., with analog phase shifters like that described in FIG. 3B) at both terminal devices (UEs) and network access nodes (gNodeBs). Similar to the beamsweeping described above, beam management seeks to identify a matched beam pair at both the UE and gNodeB side. Thus, both the UE and the gNodeB may perform a beamsweeping procedure to identify respective antenna beamforming patterns that form the matched beam pair. Because 5G NR seeks to operate when UEs are highly mobile, it can be important for beam management to operate quickly and accurately so the matched beam pair is reliable over time.

5G NR beam management supports both transmit and receive beamsweeping. Like described above for FIG. 4, a device may perform receive beamsweeping by measuring different antenna beamforming patterns and selecting one with a high radio measurement to use for reception from a target device. Both NR UEs and gNodeBs may use receive beamsweeping, namely for downlink and uplink beam acquisition and tracking. In the downlink case, a gNodeB (network access node) may transmit the downlink reference subcarrier signals of a reference signal with the same transmit antenna beamforming pattern. A UE may then sweep its antenna array across multiple receive antenna beamforming patterns, receiving a different reference signal instance with each receive antenna beamforming pattern. The UE may then measure the downlink reference subcarrier signals of each reference signal instance to obtain a radio measurement for each swept receive antenna beamforming pattern. Based on those radio measurements, the UE may select an antenna beamforming pattern to use for receiving from the gNodeB. The downlink reference subcarrier signals may be mapped to one or more synchronization signal burst (SSB) resources or channel state information reference signal (CSI-RS) resources. These SSB and CSI-RS resources are the specific time-frequency resources that 5G NR allocates to downlink reference signals.

In the uplink case, a UE may transmit uplink reference subcarrier signals of a reference signal using the same transmit antenna beamforming pattern. A gNodeB may then sweep its antenna array across multiple receive antenna beamforming patterns and receive a different reference signal instance with each receive antenna beamforming pattern. The gNodeB may then measure the uplink reference subcarrier signals in each reference signal instance to obtain a radio measurement for each swept receive antenna beamforming pattern. Based on those radio measurements, the gNodeB may select an antenna beamforming pattern to use for receiving from the UE. The uplink reference subcarrier signals may be mapped to one or more sounding reference signal (SRS) resources.

Especially in high mobility scenarios, beamsweeping is more effective when devices can test more antenna beamforming patterns in a short period of time. However, because reference signal instances are spread out over time, there is a limit on how quickly a device can test all the antenna beamforming patterns. For example, reference signal instances (e.g., SSB, CSI-RS, or SRS resources) may only be scheduled every few milliseconds, so devices may need to measure many reference signal instances to obtain radio measurements for all of the antenna beamforming patterns. This may lead to beamsweeping latency, meaning there will be a delay period during which the device is still testing antenna beamforming patterns to figure out which one to use.

Recognizing this problem, various aspects of this disclosure are directed to devices that measure multiple antenna beamforming patterns during a single symbol period of a reference signal instance. Because there may be ICI on the reference subcarrier signals, the devices may selectively activate this single-symbol multi-beam measurement when they detect low ICI conditions, such as when the subcarriers around the reference subcarriers are low or empty-loaded. The devices may also identify time points where the reference signal repeats itself in time (e.g., forms a repeating waveform in the time domain), and may control the antenna array to switch among the multiple antenna beamforming patterns at those time points. As a result, the devices may measure each antenna beamforming pattern over an identical section of the reference signal. This can produce more accurate measurements. Moreover, because the devices test multiple antenna beamforming patterns in a single symbol period, the devices may be able to complete beamsweeping quicker, thus reducing the beamsweeping latency and reducing the time it takes to find an appropriate antenna beamforming pattern.

Figure 5:
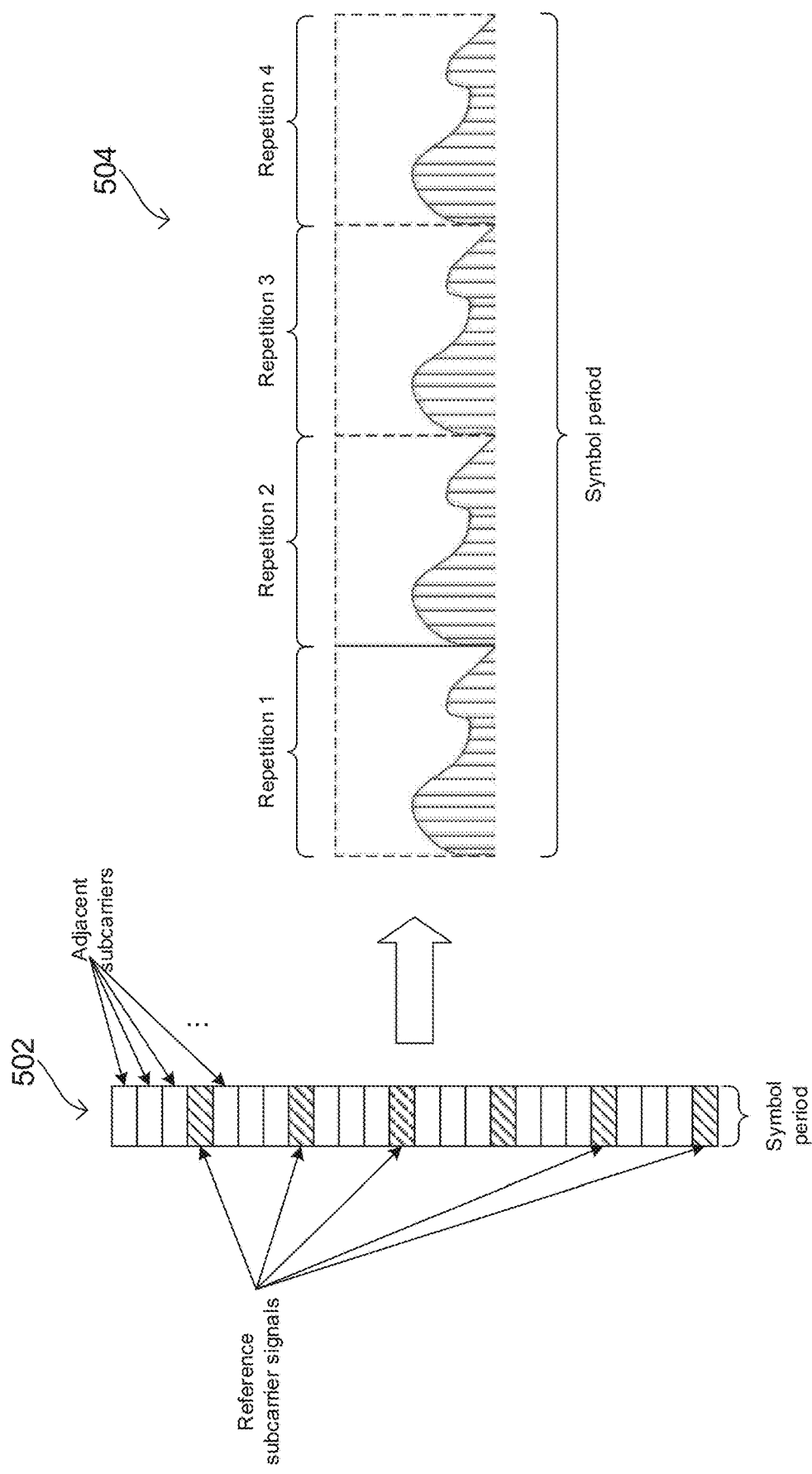
FIG. 5 shows an exemplary illustration of a reference signal repeating itself to form multiple repetitions in time according to some aspects.

These techniques exploit the unique properties of reference signals when they are free from ICI. Because of the way CSI-RS and SRS reference signals are allocated in frequency, their time-domain waveforms exhibit a special repeating property where the waveform repeats itself multiple times in each symbol period. To perform the single-symbol multi-beam measurements without ICI, aspects of this disclosure may align their beam switching with the timing of the repeating waveforms. FIG. 5 shows an example of this special repeating property of reference signals according to some aspects. As shown for reference signal waveform 504, the time-domain waveform of certain reference signals may include, for example, four repetitions of the same subwaveform in a single symbol period. This unique waveform repetition pattern happens when specific reference signals are uniformly and non-contiguously spaced in frequency. Reference signal instance 502 shows an example of this, where the reference subcarrier signals are all spaced every four subcarriers. When reference signals are allocated with such a uniform and non-contiguous allocation in frequency, their time-domain waveforms repeat itself multiple times within a single symbol period.

The number of repetitions (repeating subwaveforms in a single symbol period) depends on the subsampling rate (or, similarly, reference subcarrier spacing). For example, the 5G NR standard specifies that CSI-RS reference subcarrier signals can be allocated every 12 subcarriers (parameter D=1, signifying one CSI-RS reference subcarrier signal per 12-subcarrier resource block) or every 4 subcarriers (parameter D=3, signifying three CSI-RS reference symbols per 12-subcarrire resource block). When D=1, there is one CSI-RS reference subcarrier signal every 12 subcarriers, meaning the subsampling rate is 12. Similarly, there is one CSI-RS reference subcarrier signal every 4 subcarriers, which is a subsampling rate of 4. The number of time-domain repetitions in a single symbol period is equal to the subsampling rate of the reference signal in frequency. For example, reference signal instance 502 has a subsampling rate of 4, and reference signal waveform 504 therefore includes four repetitions. Similarly, if the subsampling rate were 12, the reference signal waveform would have 12 repetitions. This relationship holds for other subsampling rates and numbers of repetitions.

Like downlink CSI-RS reference signals, uplink SRS reference signals also exhibit the special repeating property in the time-domain. Per the 5G NR standard, SRS reference subcarrier signals may be allocated with a subsampling rate of 2 (comb-2 SRS, meaning an SRS reference subcarrier signal every two subcarriers) or with a subsampling rate of 4 (comb-4 SRS, meaning an SRS reference subcarrier signal every four subcarriers. For a subsampling rate of 2, the SRS time-domain waveform has two repetitions per single symbol period; for a sub sampling rate of 4, the SRS time-domain waveform has four repetitions per single symbol period. Table 1 below specifies the possible frequency domain subsampling rates for CSI-RS (downlink) and SRS (uplink) in 5G NR.

TABLE 1

Frequency-domain sub sampling rates and waveform repetition numbers

| Reference signal configuration | Subsampling rate | Waveform repetition number |
|---|---|---|
| CSI-RS with D = 1 | 12 | 12 |
| CSI-RS with D = 3 | 4 | 4 |
| Comb-2 SRS | 2 | 2 |
| Comb-4 SRS | 4 | 4 |

When reference signals are transmitted in an empty-loaded manner, meaning with no other data on adjacent subcarriers, they will exhibit the special repeating property in the time domain. However, the adjacent subcarriers will often carry other data, which can introduce ICI onto the reference subcarriers. This ICI will in turn disturb the special repeating property. Accordingly, when a device receives a wideband carrier that includes, in one symbol period, only reference subcarrier signals from one reference signal where the other subcarriers are empty-loaded (e.g., contain no or negligible data), the wideband signal may exhibit the special repeating property exemplified by reference signal waveform 504. Depending on the subsampling rate of the reference signal, that symbol period of the wideband signal will include a reference signal that repeats itself in time multiple times. These empty-loaded conditions can happen, for example, when a network access node serves only a small number of co-located terminal devices, and therefore does not need to multiplex reference signals from multiple terminal devices in a single reference signal instance.

Thus, when the adjacent subcarriers are empty-loaded, the time-domain waveform will include multiple repetitions that are free from ICI. Because each repetition is identical, the repetitions are ideal signals on which to perform measurements. Accordingly, aspects of this disclosure are directed to devices that detect low ICI conditions and then activate the single-symbol multi-beam measurements. Since the number of repetitions depends directly on the subsampling rate, the device may determine the time points in the symbol period where the repetitions start and end. The device may then control its antenna array to switch among the multiple antenna beamforming patterns at those time points. As a result, the device may perform each measurement on an identical subwaveform, which may improve measurement accuracy.

Figure 6:
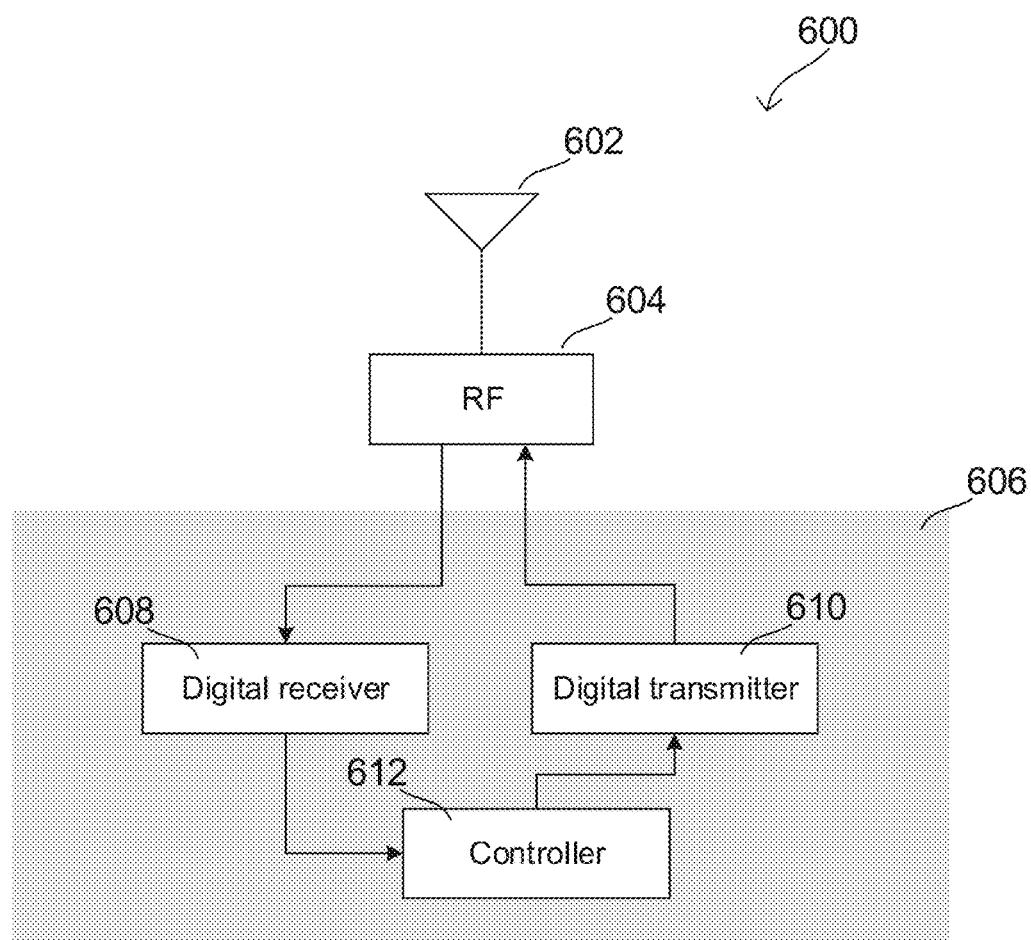
FIG. 6 shows an exemplary internal configuration of a wireless device according to some aspects.

FIG. 6 shows an exemplary internal configuration of wireless device 600 according to some aspects. In various aspects, wireless device 600 may be a terminal device (e.g., a UE) or a network access node (e.g., a gNodeB). As FIG. 6 shows, wireless device 600 may include antenna array 602, RF transceiver 604, and baseband processor 606. Wireless device 600 may transmit and receive radio signals on one or more radio access networks. Baseband processor 606 may direct that communication functionality of wireless device 600 according to the communication protocols for each radio access network, and may control antenna array 602 and RF transceiver 604 to transmit and receive radio signals according to the formatting and scheduling parameters defined by each communication protocol.

Wireless device 600 may transmit and receive wireless signals with antenna array 602, which may be an antenna array that includes multiple antenna elements. In some aspects, antenna array 602 may additionally include analog antenna combination and/or beamforming circuitry (e.g., a set of phase shifters for phased-array beamforming). In the receive (RX) path, RF transceiver 604 may receive analog radio frequency signals from antenna array 602 and perform analog and digital RF front-end processing on the analog radio frequency signals to produce digital baseband samples (e.g., In-Phase/Quadrature (IQ) samples) to provide to baseband processor 606. RF transceiver 604 may include analog and digital reception components including amplifiers (e.g., Low Noise Amplifiers (LNAs)), filters, RF demodulators (e.g., RF IQ demodulators)), and analog-to-digital converters (ADCs), which RF transceiver 604 may utilize to convert the received radio frequency signals to digital baseband samples. In the transmit (TX) path, RF transceiver 604 may receive digital baseband samples from baseband processor 606 and perform analog and digital RF front-end processing on the digital baseband samples to produce analog radio frequency signals to provide to antenna array 602 for wireless transmission. RF transceiver 604 may thus include analog and digital transmission components including amplifiers (e.g., Power Amplifiers (PAs), filters, RF modulators (e.g., RF IQ modulators), and digital-to-analog converters (DACs), which RF transceiver 604 may utilize to mix the digital baseband samples received from baseband processor 606 and produce the analog radio frequency signals for wireless transmission by antenna array 602. In some aspects baseband processor 606 may control the radio transmission and reception of RF transceiver 604, including specifying the transmit and receive radio frequencies for operation of RF transceiver 604. In aspects where wireless device 600 is a terminal device, baseband processor 606 may be a baseband modem. In aspects where terminal device 600 is a network access node, baseband processor 606 may be a baseband unit (BBU).

FIG. 6 also depicts several internal components of baseband processor 606, including digital receiver 608, digital transmitter 610, and controller 612. In some aspects, baseband processor 606 may include a digital signal processor and a protocol controller (e.g., such as in FIG. 2). Digital receiver 608, digital transmitter 610, and controller 612 may therefore be subcomponents of the digital signal processor (e.g., physical layer components) and/or subcomponents of the protocol controller (e.g., protocol stack components). In some aspects, digital receiver 608 may be the physical layer receive chain, digital transmitter 610 may be the physical layer transmit chain, and controller 612 may be the protocol controller that executes the protocol stack of baseband processor 606. For example, digital receiver 608 may include a demodulator, demapper (e.g., constellation demapper), de-interleaver, decoder, and/or descrambler. Digital receiver 608 may receive wireless signals in the form of baseband samples via antenna array 602 and RF transceiver 604. Digital receiver 608 may then sequentially process these baseband samples with the demodulator, demapper (e.g., constellation demapper), de-interleaver, decoder, and/or descrambler to produce a bitstream, which digital receiver 608 may provide to controller 612 (e.g., to protocol stack layers of controller 612). Digital transmitter 610 may include a scrambler, encoder, interleaver, mapper (e.g., constellation mapper), and/or a modulator, which may sequentially process a bitstream (e.g., provided by protocol stack layers of controller 612) to produce baseband samples (e.g., complex IQ symbols). Digital transmitter 610 may then transmit these baseband samples as wireless signals via RF transceiver 604 and antenna array 602. Controller 612 may include one or more processors configured to execute the protocol stack layers as software. This may include generating messages for digital transmitter 610 to transmit (e.g., messages including user or control data) and/or recovering messages from bitstreams provided by digital receiver 608. In some aspects, controller 612 may be configured to perform user-plane and control-plane functions to facilitate the transfer of application layer data to and from wireless device 600 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 612 may include executable instructions that define the logic of these functions.

Controller 612 may also be configured to control beamforming by antenna array 602. In some aspects, controller 612 may be configured with the features of beamforming controller 302 in FIGS. 3A and 3B and may control the digital or RF beamforming of antenna array 602. Controller 612 may therefore select the beamforming weight vector for antenna array 602 (either to apply digitally as in FIG. 3B or with RF phase shifters as in FIG. 3B).

Figure 10:
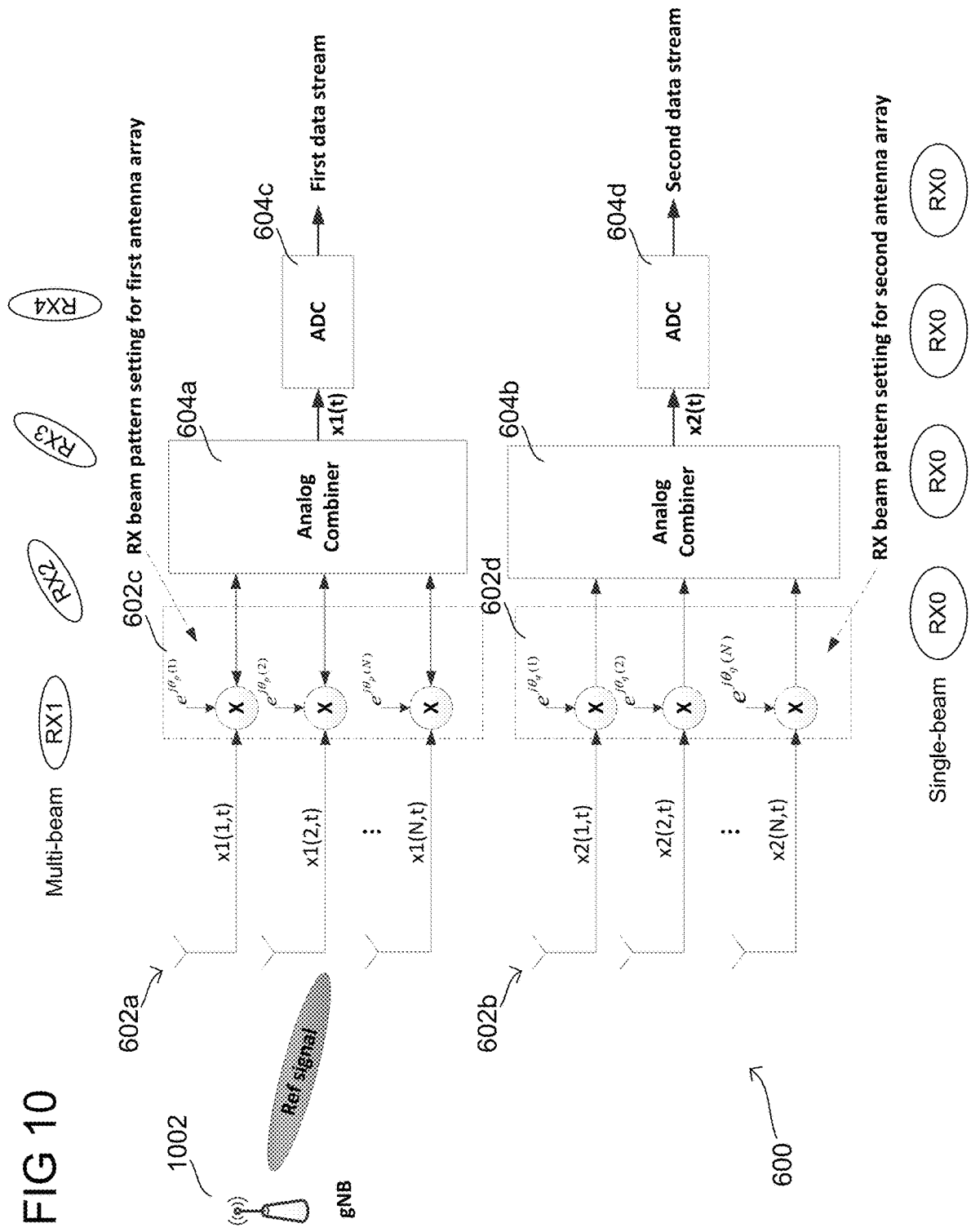
FIG. 10 shows an exemplary internal configuration of a wireless device using separate antenna elements to receive the first and second streams for dual-stream load detection according to some aspects.
Figure 11:
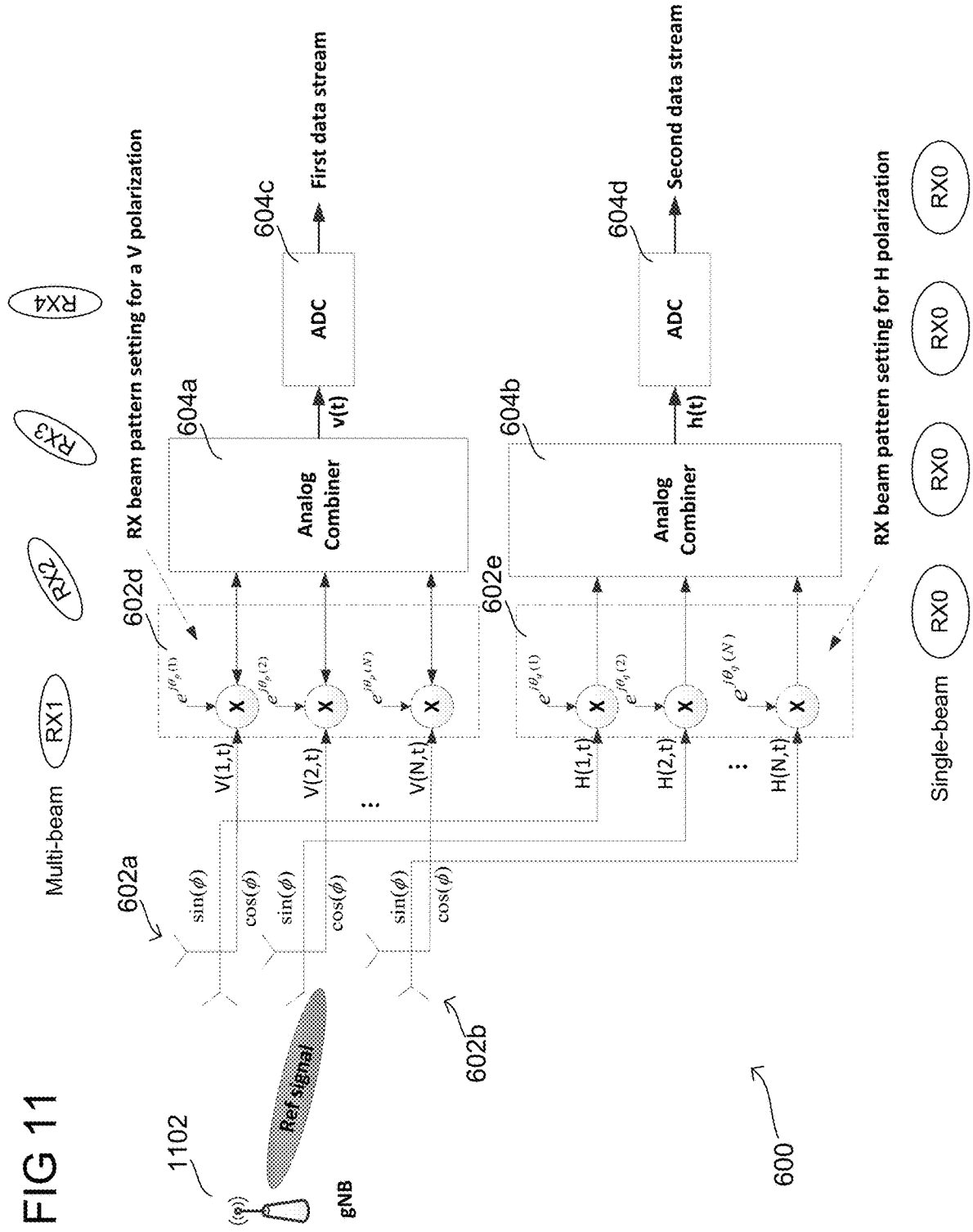
FIG. 11 shows an exemplary internal configuration of a wireless device using different polarized ports of elements of an antenna array to receive the first and second streams for dual-stream load detection according to some aspects.
Figure 12:
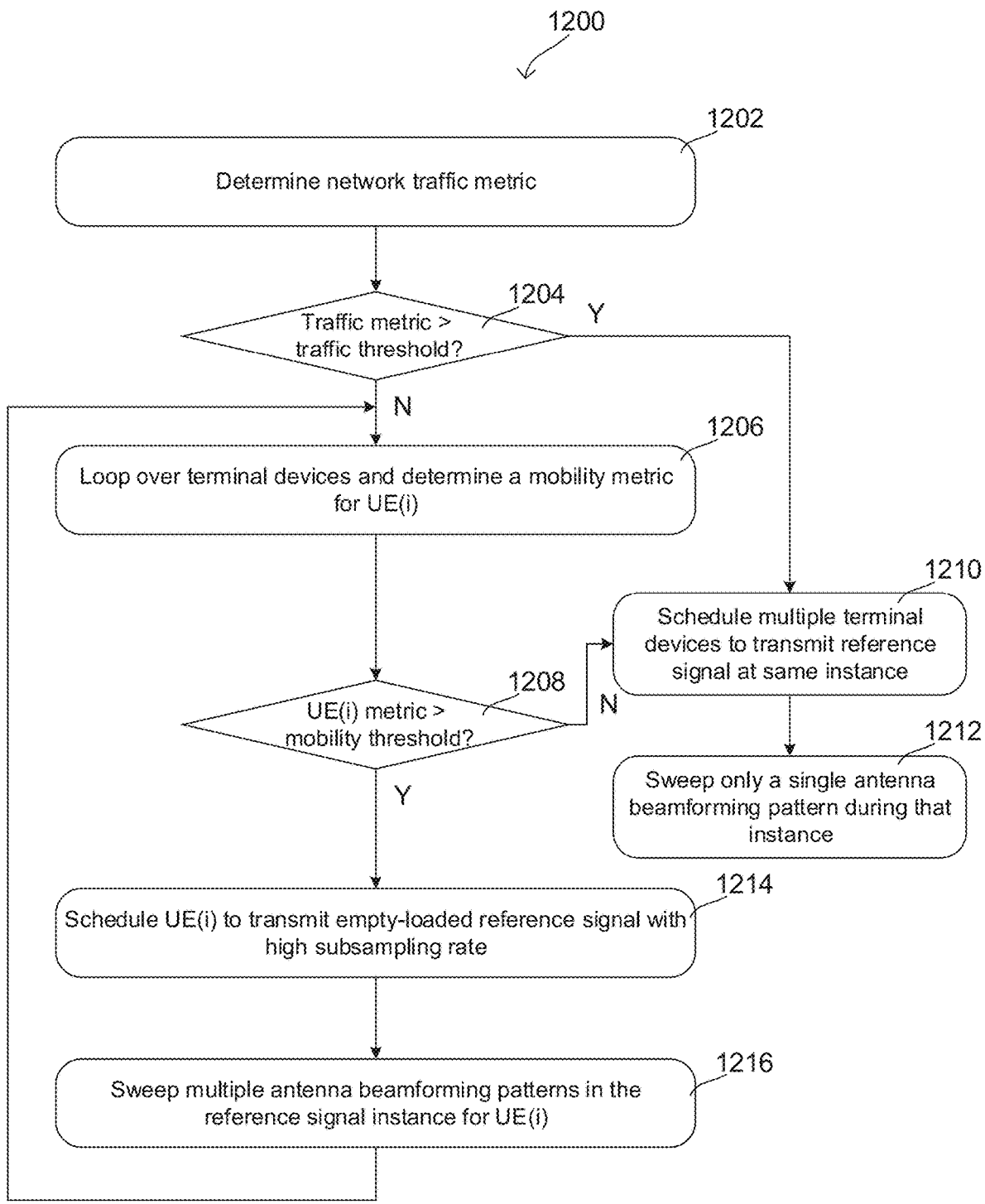
FIG. 12 shows an exemplary flow chart for performing single-symbol multi-beam measurements at a network access node according to some aspects.

Wireless device 600 may be configured to perform single-symbol multi-beam measurement for beamsweeping. FIGS. 7-11 show different options for the single-symbol multi-beam measurement technique where wireless device 600 is a terminal device, while FIG. 12 shows an option for single-symbol multi-beam measurement where wireless device 600 is a network access node. Because network access nodes can control how uplink transmissions are allocated, network access nodes may be able to directly determine and control the loading of subcarriers around the reference subcarrier signals. Thus, network access nodes may not need to perform ICI and/or load detection, and may instead reference, or even control, the uplink transmission schedule to determine whether there is low load around the reference subcarrier signals (e.g., around the subcarriers that carry the reference symbols of that reference signal instance). If so, the network access node may activate the single-symbol multi-beam measurements. Terminal devices, on the other hand, may not have access to downlink transmission schedules, and so may not have any explicit information about the loading of subcarriers around the reference subcarrier signals. Terminal devices may therefore use radio measurements to detect ICI and/or load. Based on those radio measurements, terminal devices may activate the single-symbol multi-beam measurement technique of this disclosure.

Figure 7:
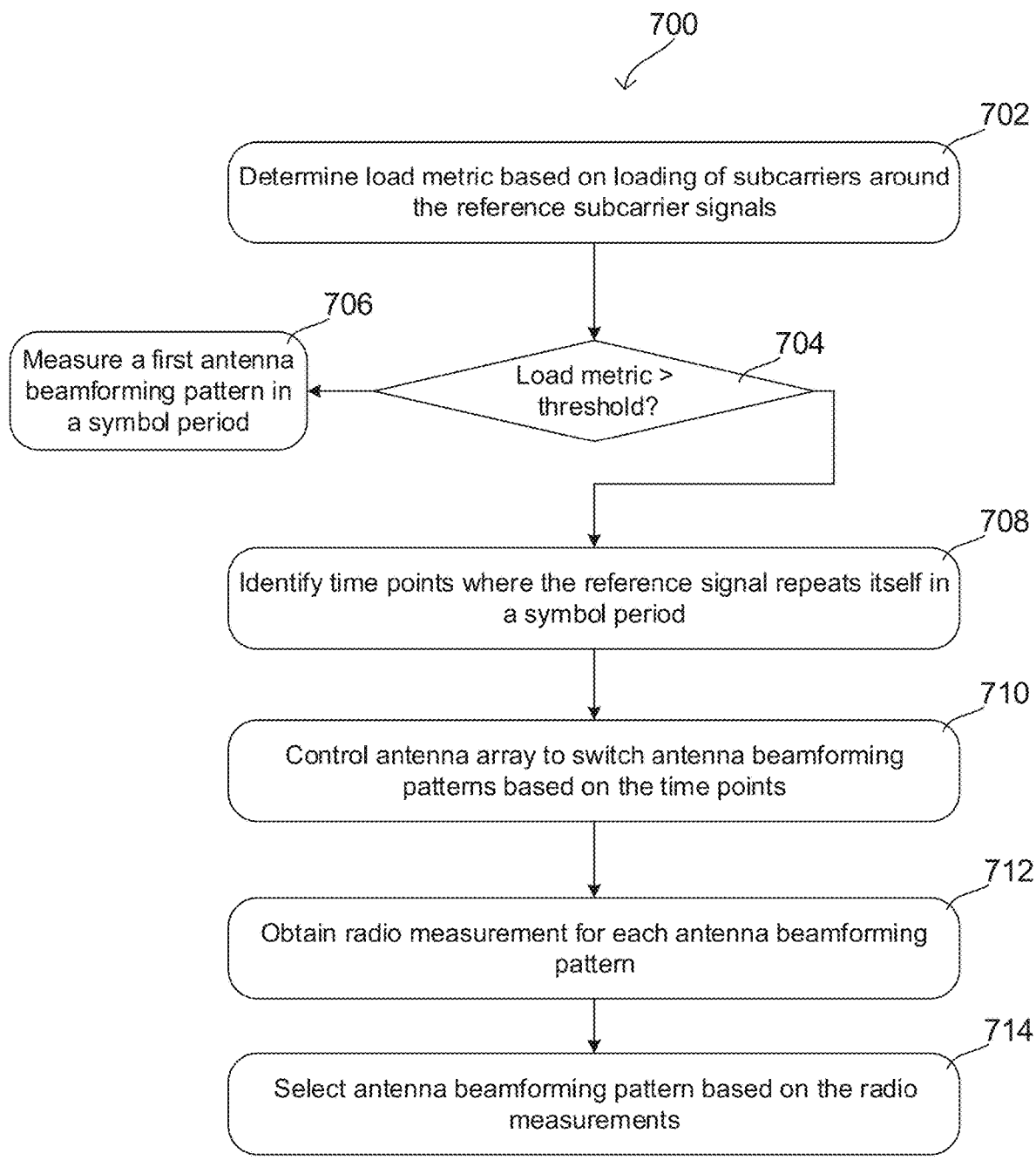
FIG. 7 shows an exemplary flow chart of performing single-symbol multi-beam measurement at a terminal device with historical load detection according to some aspects.

Starting with the terminal device option of FIG. 7, wireless device 600 may first determine a load metric based on the loading of subcarriers around the reference subcarrier signals (e.g., of the subcarriers adjacent to those carrying the reference symbols) in stage 702. As previously explained, wireless device 600 may activate the single-symbol multi-beam measurement when there is no or light loading (meaning no or low ICI) on the subcarriers around the reference signals. Thus, by determining a load metric that indicates that when there is low loading and low ICI, wireless device 600 may obtain a quantitative metric that indicates whether the reference signals are exhibiting the special repetition property explained in FIG. 5.

In the example of FIG. 7, wireless device 600 may use historical measurements to determine the load metric. For example, in some cases the network access node (that is serving wireless device 600) may allocate the reference signal on a deterministic schedule, such as with periodic or semi-persistent CSI-RS resources. When the network access node allocates the reference signal with a periodic schedule, the network access node periodically transmits the reference signal on a fixed repetition period, and will continue to do so over time. By contrast, when the network allocates the reference signal with semi-persistent schedule, the network access node can dynamically activate and deactivate the reference signal (e.g., with downlink control information (DCI)). When the network access node has activated the reference signal with semi-persistent scheduling, the network access node periodically transmits the reference signal with a fixed repetition period. The network access node is still free to deactivate the reference signal in any given subframe.

Accordingly, the reference signal may be deterministic in both the periodic and semi-periodic cases. Since the reference signal in deterministic, the loading of past reference signal instances may be predictive of how loaded upcoming reference signal instances will be. Using FIG. 4 as a basic example, the loading around the reference subcarrier signals in reference signal instances 402 and 404 may be predictive (to a degree) of the loading of subcarriers around the reference subcarrier signals of reference signal instance 406. For example, in 5G NR, each CSI-RS (e.g., the reference subcarrier signals that map to a specific CSI-RS resource) is configured in a UE-specific manner. The network access node may therefore assign specific UEs to different CSI-RS resources, such as where one UE is assigned its own CSI-RS resource or where multiple co-located UEs are assigned to the same CSI-RS resource. Although a network access node may transmit multiple CSI-RS resources, it may generally schedule multiple CSI-RS resources in the same symbol period, such as using frequency multiplexing so the CSI-RS resource share the same symbol period on different frequencies. Using the example of FIG. 4, the subcarriers around the depicted CSI-RS resource will often also carry other CSI-RS resources (e.g., the CSI-RS resources assigned to other UEs or groups of UEs). If all or most of the CSI-RS resources are periodic or semi-persistent, the loading of those adjacent subcarriers will be deterministic, meaning that a terminal device can use historical radio measurements to predict the loading for upcoming reference signal instance.

Thus, if the reference signal is allocated with a periodic or semi-persistent schedule, wireless device 600 may determine the load metric in stage 702 based on historical radio measurements of the reference signal. For example, digital receiver 608 may receive and process a plurality of past reference signal instances (with a same resource ID; e.g., same reference signal) to obtain the load metric for a reference signal. In one example, digital receiver 608 may perform a reference signal receive quality (RSRQ) measurement on the plurality of past reference signal instances, such by receiving the reference signal during those instances, measuring the signal power of the reference subcarrier signals, and taking the ratio of reference signal power to the wideband carrier energy. If there is low loading on the non-reference subcarriers, the wideband carrier energy will be low, and the RSRQ measurement will be high. Conversely, if there is high loading on the non-reference subcarrier signal subcarriers, the wideband carrier energy will be high, and the RSRQ measurement will be low. The RSRQ measurement may therefore indicate the loading of the subcarriers around the reference subcarrier signals. If those subcarriers are empty-loaded, the wideband carrier energy will only be noise and the RSRQ measurement will be at a maximum. RSRQ measurements are one example of a load metric, and other aspects may use other load metrics that indicate the loading of carriers around the reference subcarrier signals.

Controller 612 may then use the load metrics from the plurality of past reference signal instances to determine whether an upcoming reference signal instance is lightly loaded (e.g., very low ICI or empty-loaded). This upcoming reference signal instance is the reference signal instance that controller 612 plans to use for the single-symbol multi-beam measurement. In one example, digital receiver 608 may average together load metrics and then report the average load metric to controller 612. Controller 612 may then use that average load metric as the load metric for load detection. Since controller 612 is making a decision whether to use single-symbol multi-beam measurement for an upcoming reference signal instance, controller 612 may perform this before the upcoming reference signal instance.

Controller 612 may then compare the load metric to a load threshold in stage 704 and determine whether the load of the subcarriers around the reference subcarrier signals is less than a predefined level. For RSRQ, higher values of the load metric indicate lower load, since higher RSRQ means that the reference signals have much stronger power than the rest of the wideband carrier. Accordingly, if the load metric is greater than the load threshold, the load metric indicates the load of the subcarriers is less than the predefined level. Conversely, if the load metric is less than the load threshold, the load metric indicates the load of the subcarrier is greater than the predefined level. In some aspects, wireless device 600 may use other types of load metrics that operate in this same manner, where higher values indicate lower load. In some aspects, wireless device 600 may use other load metrics that operate in a different manner, such as where lower values indicate lower load. In those cases, controller 612 may determine the load is less than the predefined level if the load metric is less than the predefined level While below examples may use load metrics that indicate lower load with higher values, these examples can alternatively use load metrics that indicate higher load with higher values.

If controller 612 determines the load metric is less than the threshold (e.g., the load of the subcarriers around the reference subcarrier signals is greater than the predefined level), controller 612 may decide to measure only one antenna beamforming pattern in the upcoming reference signal instance. In other words, if the load metric is less than the threshold, the subcarriers around the reference subcarrier signals in the upcoming reference signal instance are likely not empty-loaded. This means there will be ICI on the reference subcarrier signals, and the reference signals in turn will not form identical repetitions like in FIG. 5. Since the upcoming reference signal instance is not a good candidate for single-symbol multi-beam measurement, controller 612 may control wireless device 600 to only measure one antenna beamforming pattern in the upcoming reference signal instance (e.g., only a single antenna beamforming pattern in that symbol period).

Accordingly, in that case digital receiver 608 may measure a single antenna beamforming pattern in the symbol period of the upcoming reference signal instance in stage 706. Controller 612 may control antenna array 602 to set to the single antenna beamforming pattern, such as by providing control signaling to phase array shifters in antenna array 602 that adjust the phases of the signals received by each element. Digital receiver 608 may then receive the resulting data (IQ samples) from RF transceiver 604 and then perform a radio measurement on the data. In some aspects, digital receiver 608 may perform a signal power measurement when it measures an antenna beamforming pattern. The signal power measurement can be a total signal power measurement or a useful signal power measurement. For a total signal power measurement, digital receiver 608 may measure the power of the data across the whole wideband carrier. In a useful signal power measurement, digital receiver 608 may first isolate the reference subcarrier signals and then measure the power of the reference subcarrier signals. In either case, the radio measurement may indicate the strength of the received data. When wireless device 600 uses an antenna beamforming pattern that is steered towards the transmitting network access node, the reception sensitivity in that direction will generally be higher. As a result, the signal power measurements will be higher for that antenna beamforming pattern. The value of the signal power measurement may therefore indicate the performance of the corresponding antenna beamforming pattern.

In this case, controller 612 may obtain a single radio measurement for a single antenna beamforming pattern in the upcoming reference signal instance. Controller 612 may then repeat this procedure for subsequence reference signal instances, selecting a different antenna beamforming pattern and obtaining a radio measurement for only that one antenna beamforming pattern in each reference signal instance. Controller 612 may continue until it has measured each of a plurality of antenna beamforming patterns (e.g., the set of candidate beams it is considering to use). Controller 612 may then perform stage 714 as described below.

In the alternate case of stage 704, controller 612 may determine that the load metric is greater than the load threshold (e.g., that the load of the subcarriers around the reference subcarrier signals is less than the predefined level). In that case, the subcarriers around the reference subcarrier signals in the upcoming reference signal instance may be lightly loaded (e.g., empty-loaded or very low ICI). This means that the reference subcarrier signals will likely form the identical repetitions like in FIG. 5. Since the upcoming reference signal instance will have low ICI, wireless device 600 may be able to obtain accurate measurements, even when measuring multiple antenna beamforming patterns in a single symbol period. Controller 612 may therefore control wireless device 600 to perform the single-symbol multi-beam measurement technique in stages 710-714.

Specifically, controller 612 may first identify time points where the reference signal repeats itself in the symbol period of the upcoming reference signal instance in stage 708. As described for FIG. 5 and Table 1, the number of repetitions of the time-domain waveform is controlled by the subsampling rate. Each repetition may be a subwaveform of identical shape and duration, so controller 612 may be able to identify the time points where each repetition ends and the next repetition ends based on the subsampling rate. In 5G NR, the subsampling rate is controlled by the scheduling parameter D (for CSI-RS) or comb-2 (for SRS). In the downlink CSI-RS example of FIG. 7, controller 612 may therefore identify the time points based on the scheduling parameter D, such as with the repetition number specified in Table 1.

Once controller 612 identifies the time points, controller 612 may know the locations of the repetitions in the symbol period of the upcoming reference signal instance. Controller 612 may then in stage 710 control antenna array 602 to switch among multiple antenna beamforming patterns at the time points in the upcoming reference signal instance. For example, if there are four repetitions, controller 612 may control antenna array 602 to switch among four antenna beamforming patterns. Controller 612 may time the switches to align with the repetitions. The time period for which antenna array 602 is set to each antenna beamforming pattern will therefore align with one of the repetitions in the upcoming reference signal instance.

Figure 9:
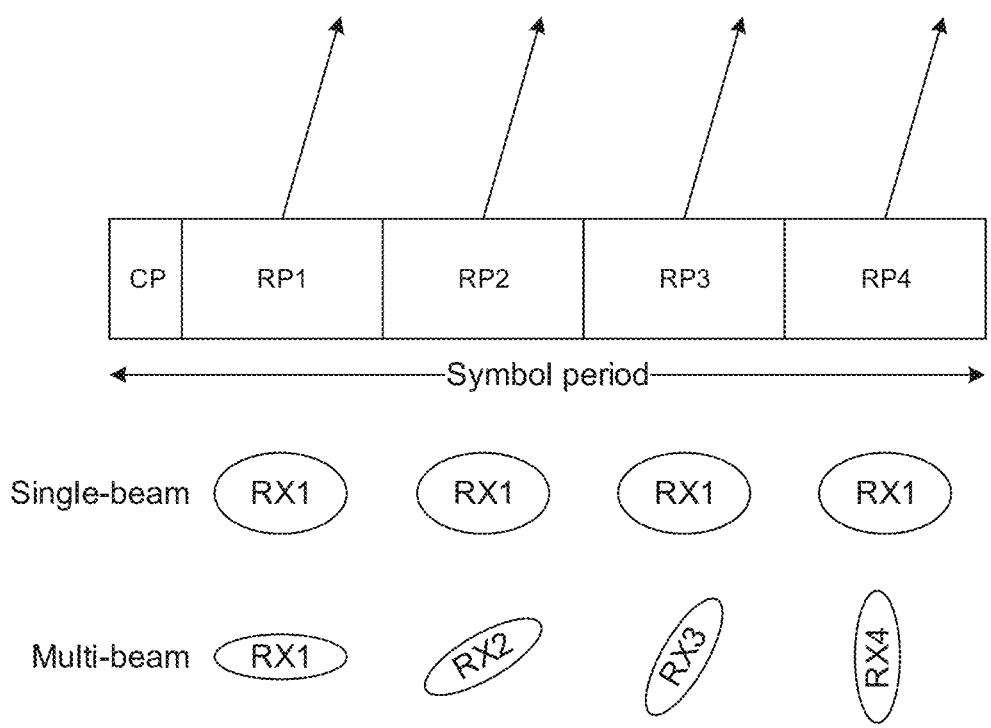
FIG. 9 shows an example of the antenna beamforming patterns used for the first and second streams during dual-stream load detection according to some aspects.

FIG. 9 shows an example comparing the single-symbol single-beam measurement technique of stage 706 to the single-symbol multi-beam measurement technique of stage 710. As shown in FIG. 9, the symbol period of the upcoming reference signal instance may include a cyclic prefix and four repetitions RP1-RP4. This four-repetition example maps to subsampling rate equal to 4, such as the D=3 case for CSI-RS. Each repetition may be the same identical subwaveform. When wireless device 600 measures only a single beam, like in stage 706, controller 612 may keep antenna array 602 set to only one antenna beamforming pattern (e.g., a first antenna beamforming pattern like RX1) during the symbol period. Conversely, when wireless device 600 measures multiple beams in one symbol period, controller 612 may switch antenna array 602 between multiple antenna beamforming patterns that align with the repetitions in the reference signal. In FIG. 9's example, antenna array 602 may switch among antenna beamforming patterns (RX1-RX4). The time period for which antenna array 602 is set to each antenna beamforming pattern may align with one of the repetitions.

Thus, when controller 612 controls antenna array 602 to switch among the multiple antenna beamforming patterns based on the time points in stage 710, digital receiver 608 may receive separate substreams of data (via RF transceiver 604) that respectively correspond to each of the antenna beamforming patterns. Digital receiver 608 may then perform a radio measurement on each respective data stream to obtain a radio measurement for each of the multiple antenna beamforming patterns in stage 712. Like described above, digital receiver 608 may use a signal power measurement as the radio measurement, such as a total signal power measurement or a useful signal power measurement.

In some aspects, wireless device 600 may repeat this procedure over multiple reference signal instances. For example, controller 612 may start with a plurality of antenna beamforming patterns that it is considering as candidates for communicating with the network access node. Because controller 612 can only measure a limited number of antenna beamforming patterns in each reference signal instance (e.g., depending on the adjacent subcarrier loading and the number of repetitions), controller 612 may spread the radio measurements over multiple reference signal instances. In other words, controller 612 may select, from the plurality of antenna beamforming patterns, a new set of antenna beamforming patterns that have not yet been measured. Controller 612 may then measure this new set of multiple antenna beamforming patterns in the upcoming reference signal instance, and then select another new set of antenna beamforming patterns for the next upcoming reference signal instance. Wireless device 600 may repeat the procedure of stages 702-712 over multiple reference signal instances until controller 612 obtains radio measurements for all of the plurality of antenna beamforming patterns.

In some aspects, controller 612 may instruct digital receiver 608 to continue to perform load metric measurements on each reference signal instance. If the load metrics continue to indicate low load (e.g., empty load or otherwise very low ICI), controller 612 may continue to use the single-symbol multi-beam measurement technique to measure the plurality of antenna beamforming patterns. If the load metrics indicate higher load, however, controller 612 may switch to measuring only a single antenna beamforming pattern in each reference signal instance, as in stage 706. Controller 612 may continue in that manner until either the load metric again increases above the load threshold (e.g., load drops below the predefined level) or until it has measured all of the plurality of antenna beamforming patterns.

After controller 612 obtains radio measurements for all of the plurality of antenna beamforming patterns (with single-beam and/or multi-beam measurement), controller 612 may select an antenna beamforming pattern based on the radio measurements in stage 714. In one example, controller 612 may identify the antenna beamforming pattern that produced the highest radio measurement. Controller 612 may then use this antenna beamforming pattern to receive data from the network access node. For example, controller 612 may control antenna array 602 to receive with a beamforming weight vector that produces the antenna beamforming pattern at antenna array 602. Digital receiver 608 may then receive the data via RF transceiver 604 and antenna array 602 tuned to the antenna beamforming pattern.

By selecting an antenna beamforming pattern that steers towards the network access node, wireless device 600 may increase the receive sensitivity in that direction and, as a result, improve performance. Furthermore, by using the single-symbol multi-beam measurement technique, wireless device 600 may be able to measure the plurality of antenna beamforming patterns in less time. And, because wireless device 600 identifies empty-load and low-ICI scenarios to trigger the single-symbol multi-beam measurement technique, wireless device 600 may still obtain accurate radio measurements even when measuring multiple antenna beamforming patterns in a single symbol period.

As previously indicated, message flow chart 700 in FIG. 7 may apply when the reference signal is scheduled with a periodic or semi-persistent schedule. Flow chart 800 in FIG. 8, on the other hand, may apply for any type of scheduling the reference signal. Accordingly, wireless device 600 may be able to use flow chart 800 when the reference signal is allocated with any type of scheduling, including periodic, semi-persistent, and aperiodic. In the aperiodic case, the network access node may be able to schedule and transmit a reference signal (e.g., CSI-RS) during any subframe, such as by indicating in the subframe's control channel (e.g., DCI) that a certain symbol period will contain the reference signal. Because the scheduling of aperiodic reference signals is largely unpredictable, wireless device 600 may not use historical radio measurements to predict whether an upcoming reference signal instance will have light load or low ICI. Instead, wireless device 600 may use two parallel data streams: a first data stream to use for multi-beam measurements, and a second data stream to evaluate for detecting light load. Although this parallel stream technique may work for aperiodic reference signal scheduling, wireless device 600 may also use it for periodic and semi-persistent reference signal scheduling.

Figure 8:
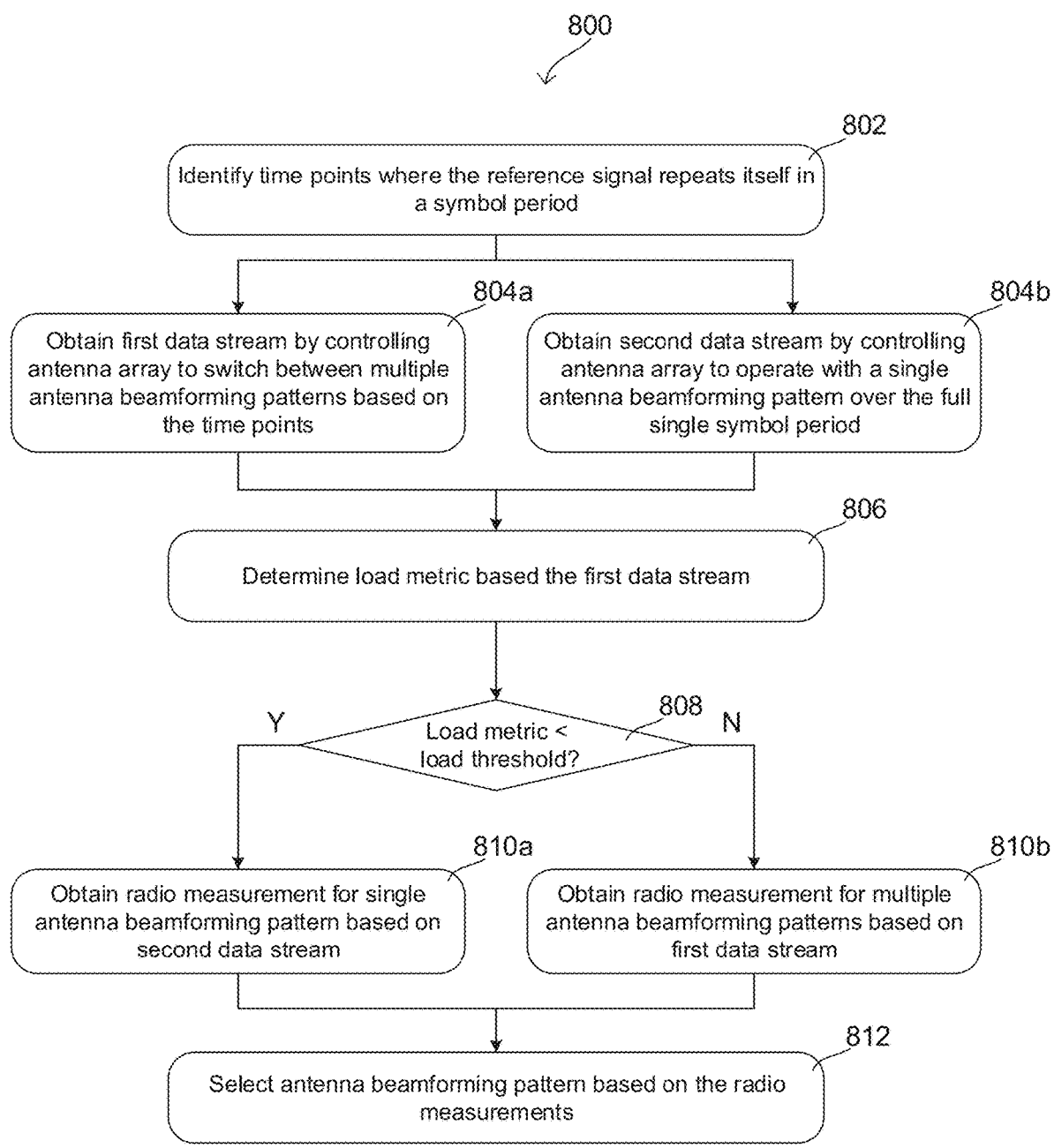
FIG. 8 shows an exemplary flow chart of performing single-symbol multi-beam measurement at a terminal device with dual-stream load detection according to some aspects.

FIG. 8 shows exemplary flow chart 800 detailing the parallel data stream procedure according to some aspects. FIG. 10 shows an exemplary internal configuration of wireless device 600 for performing flow chart 800. As shown in FIG. 10, network access node 1002 may generate and transmit the reference signal (e.g., CSI-RS) to wireless device 600. For example, network access node 1002 may decide to transmit the reference signal in a particular subframe, and may send control signaling to wireless device 600 that specifies that the subframe will include a reference signal at a certain symbol period of the subframe. Wireless device 600 may then perform flow chart 800 using the reference signal instance specified by network access node 1002. Controller 612 may first identify the time points where the reference signal repeats itself in the symbol period in stage 802. As previously explained for stage 708 in FIG. 7, controller 612 may identify these time points based on the subsampling rate indicated by the parameter D (for CSI-RS in this example). These time points indicate where the reference signal repeats itself when there is no ICI, or in other words, when the subcarriers around the reference subcarrier signals are empty-loaded. At this stage, however, controller 612 may not know whether the adjacent subcarriers are actually empty-loaded. In either case, the time points are the times in the symbol period where the reference signal would repeat itself when there is no ICI (e.g., the hypothetical time points assuming the adjacent subcarriers are empty loaded).

Wireless device 600 may then receive a first and second data stream in stages 804a and 804b. The first data stream may be data for performing multi-beam measurements while the second data stream may be data for detecting light load on the adjacent subcarriers. Wireless device 600 may receive the first data stream in stage 804a by controlling antenna array 602 to switch among multiple antenna beamforming patterns based on the time points. As FIG. 10 shows, antenna array 602 may include first antenna array 602a and second antenna array 602b. Wireless device 600 may use first antenna array 602a to receive the first data stream. Controller 612 may control first antenna array 602a to switch among multiple antenna beamforming patterns (e.g., RX1-RX) at the time points in the symbol period. Thus, controller 612 may control first phase shifter array 602c to weight their respective antenna signals (x1(1,t)-x1(N,t), where N is the number of antennas in antenna array 602a) with the beamforming weights that produce the multiple antenna beamforming patterns. Like described above, controller 612 may control first antenna array 602a to switch among the multiple antenna beamforming patterns in a time-multiplexed manner. In other words, antenna array 602a may set to a first beamforming pattern (RX1) during a first repetition in the reference signal, a second beamforming pattern (RX2) during a second repetition in the reference signal, and so forth. The time points may identify the points in time when a repetition ends and the next repetition begins.

Analog combiner 604a may combine together the weighted signals from each antenna in first antenna array 602a to obtain a combined signal (x1(t)). ADC 604c may then perform analog-to-digital conversion to obtain the first data stream. This first data stream may be IQ samples. Because first antenna array 602a switched among the multiple beams, the first data stream may include separate substreams that correspond to each of the multiple antenna beamforming patterns. For example, the first data stream may include a first substream including the IQ samples from when first antenna array 602a was set to the first antenna beamforming pattern, a second substream including the IQ samples from when first antenna array 602a was set to the second antenna beamforming pattern, and so forth for each antenna beamforming pattern used for this reference signal instance. ADC 604c may provide this first data stream to digital receiver 608.

Concurrent to obtaining the first data stream, wireless device 600 may also obtain the second data stream in stage 804b. Instead of switching between multiple antenna data patterns like for the first data stream, wireless device 600 may obtain the second data stream by controlling antenna array 600 to operate with only one antenna beamforming pattern during the symbol period of this reference signal instance. As shown in FIG. 10, controller 612 may control second antenna array 602b to receive with a single antenna beamforming pattern (RX0) during the full symbol period of the reference signal instance. Controller 612 may therefore set phase shifter array 602d to beamforming weights that produce the single antenna beamforming pattern. Analog combiner 604b may combine the resulting weighted signals, and ADC 604d may perform analog-to-digital conversion on the weighted signals to obtain the second data stream.

Wireless device 600 may therefore obtain the first and second data streams for the reference signal instance in stages 804a and 804b. Then, in stage 806 wireless device 600 may determine a load metric based on the second data stream. For example, digital receiver 608 may determine the load metric as a radio measurement that indicates the loading of subcarriers around the reference subcarrier signals. In one example, digital receiver 608 may determine the load metric by performing an RSRQ measurement on the second data stream. Digital receiver 608 may then provide the load metric to controller 612.

Controller 612 may then compare the load metric to a load threshold in stage 808 to determine whether the load of the subcarriers around the reference subcarrier signals is less than a predefined level. If the load metric is greater than the load threshold (e.g., for RSRQ), this may mean that the subcarriers around the reference subcarrier signals (in the reference signal instance) are lightly loaded and that there is low or no ICI. Because there is low or no ICI, the reference signal will have the special repeating property and wireless device 600 can use single-symbol multi-beam measurement. If the load metric is less than the load threshold, on the other hand, the subcarriers around the reference subcarrier signals may not be lightly loaded and may contain ICI. This may corrupt the reference signal's repetitions and reduce the accuracy of single-symbol multi-beam measurement.

Accordingly, if controller 612 determines that the load metric is less than the load threshold in stage 808, controller 612 may decide to discard the first data stream and only use the second data stream. Thus, in stage 810a controller 612 may instruct digital receiver 608 to obtain a radio measurement for the single antenna beamforming pattern based on the second data stream. Digital receiver 608 may then perform, for example, a signal power measurement on the second data stream (e.g., while it is still buffered) to obtain a radio measurement for the single antenna beamforming pattern. Accordingly, even though wireless device 600 could not measure multiple antenna beamforming patterns in this reference signal instance (due to high ICI), wireless device 600 may still obtain a radio measurement for the single antenna beamforming pattern used for the second data stream.

Conversely, if controller 612 determines that the load metric is greater than the load threshold in stage 808, controller 612 may decide to use the first data stream and obtain radio measurements for the multiple antenna beamforming patterns. Thus, in stage 810b controller 612 may instruct digital receiver 608 to obtain radio measurements for the multiple antenna beamforming patterns based on the first data stream. For example, digital receiver 608 may process the first substream (of the first data stream) to obtain a radio measurement (e.g., a signal power measurement) for the first antenna beamforming pattern. As explained above, the samples of the first substream correspond to the time period where first antenna array 602a was set to the first antenna beamforming pattern. Digital receiver 608 may process the second substream to obtain a radio measurement for the second antenna beamforming pattern. In this manner, digital receiver 608 may obtain a radio measurement for each of the multiple antenna beamforming patterns used in the first data stream.

In some aspects, wireless device 600 may repeat the procedure of stages 802-810 over a sequence of reference signal instances, thus obtaining a radio measurement for one antenna beamforming pattern (stage 810a) or for multiple antenna beamforming patterns (stage 810b) in each reference signal instance. As previously described for FIG. 7, controller 612 may repeat this procedure to try to obtain a radio measurement for each of a plurality of antenna beamforming patterns. This plurality of antenna beamforming patterns may be the candidate beams that wireless device 600 is considering as a receive antenna beamforming pattern for receiving from the network access node. Accordingly, for the next reference signal instance (e.g., scheduled periodically, schedule semi-persistently, or triggered aperiodically), controller 612 may identify antenna beamforming patterns that have not yet been measured, and may use those antenna beamforming patterns as the single antenna beamforming pattern (for the second data stream) or as one of the multiple antenna beamforming patterns (for the first data stream). In some aspects, controller 612 may use a given antenna beamforming pattern as both the single antenna beamforming pattern and as one of the multiple antenna beamforming patterns. With that approach, controller 612 will obtain a radio measurement for this antenna beamforming pattern regardless of whether the second data stream's load metric is less than the load threshold. In other aspects, controller 612 may select different antenna beamforming patterns from the single-antenna beamforming pattern and the multiple antenna beamforming patterns.

Controller 612 may eventually obtain radio measurements for each of the plurality of antenna beamforming patterns. Controller 612 may then select, based on the radio measurements, an antenna beamforming pattern in stage 812. In one example, controller 612 may identify the antenna beamforming pattern that produced the highest radio measurement (e.g., highest signal power measurement) and select that antenna beamforming pattern in stage 812. Controller 612 may then control antenna array 602 to receive signals from the network access node with that antenna beamforming pattern. In some aspects, controller 612 may use this as part of a beamsweeping procedure, such as to select an antenna beamforming pattern for 5G NR beam management.

While FIG. 10's example used two separate antenna arrays within antenna array 602, wireless device 600 may alternatively use different polarizations of the same antenna elements to obtain the first and second data streams. FIG. 11 shows an exemplary internal configuration of wireless device 600 using this alternate technique according to some aspects. As shown in FIG. 11, antenna array 602 may include a panel of antenna elements. The antenna elements may be dual-polarized, meaning that each antenna element has two output ports with different polarization angles. In FIG. 11's example, the two ports have 90-degree rotated angles, so one port on each antenna element has a vertical polarization (V) while the other port has a horizontal (H) polarization. The vertically polarized ports are identified as ports 602a, which have a projection of $\cos(\phi)$. The horizontally polarized ports are identified as ports 602b with a projection of $\sin(\phi)$. The projection is determined by $\phi$, which is the angle delta between the polarization ports (V or H) and the polarization angle of the propagated downlink signal arriving at wireless device 600. The sine and cosine projections are self-contained in the dual-polarized antenna elements, and the projection value φ depends on the actual propagation conditions.

Because of the polarization between the output ports of each antenna element, each port behaves like an independent antenna with strong isolation from each other. In this example, wireless device 600 may therefore use the separate ports as separate antennas to produce the first and second data streams. As FIG. 11 shows, antenna array 602 may feed the vertical-polarized port outputs (V(1,t)-V(N,t)) to phase shifter array 602d and the horizontal-polarized port outputs (H(1,t)-H(N,t)) to phase shifter array 602e. Controller 612 may control phase shifter array 602d to switch among the multiple antenna beamforming patterns, thus obtaining the first data stream at the output of ADC 604c. Controller 612 may likewise control phase shifter array 602d to set to the single antenna beamforming pattern, thus obtaining the second data stream at the output of ADC 604d. Wireless device 600 may use this dual-polarization configuration to perform flow chart 800 in the same way described above for the dual-antenna array case.

To summarize FIGS. 8-11, wireless device 600 may use these techniques and/or configurations to dynamically trigger single-symbol multi-beam measurement for any type of reference signal scheduling. In some aspects, wireless device 600 may deactivate the first data stream if controller 612 consistently determines the load metric is less the load threshold (e.g., indicates the load is greater than the predefined level). For example, if controller 612 determines that the load metric for a predefined number of consecutive reference signal instances is less than the load metric, controller 612 may deactivate the first data stream. Controller 612 may then only use the second data stream. In other words, controller 612 may not use multi-beam measurement but may only use single-beam measurement. Controller 612 may therefore fall back to the legacy method of only sweeping one antenna beamforming pattern per symbol period. This can ensure system robustness and avoid the scenario where controller 612 keeps obtaining two data streams only to discard one of them.

This disclosure has thus far described single-symbol multi-beam techniques for terminal devices. As previously explained, in some aspects a network access node (e.g., a gNodeB) may use the single-symbol multi-beam techniques. Since network access nodes schedule the uplink terminal device transmissions, a network access node has explicit information about the load information of a reference signal instance. In a 5G NR example, a gNodeB may schedule the uplink transmissions for its UEs, and may therefore be able to control whether a given SRS instance includes only a single transmission by one UE (e.g., an empty-loaded SRS symbol) or is a shared transmission from multiple UEs (e.g., a heavily loaded SRS symbol). In other words, the gNodeB will have control over whether the symbol period for a given SRS instance includes only an SRS transmission from one UE (low ICI) or an SRS transmission from many UEs (more ICI).

Because of this, a network access node may not need to employ measurement-based detection to determine whether a given reference signal instance is lightly loaded. Because network access nodes are responsible for scheduling uplink transmissions to begin with, a network access node may selectively schedule uplink reference signal transmissions to be empty-loaded. Once the network access node schedules an empty-loaded reference signal transmission (e.g., scheduling only one terminal device to transmit a reference signal in a given reference signal instance), the network access node can use the single-symbol multi-beam measurement technique to measure multiple antenna beamforming patterns for that reference signal instance.

Deciding to schedule empty-loaded reference signal instances, however, may present a tradeoff. If a network access node schedules only a single terminal device in each reference signal instance, it may take a long time for the network access node to test out the antenna beamforming patterns for each served terminal device. There may therefore be a long latency in selecting an appropriate beamforming pattern for each served terminal device, especially if network traffic is high and network access node needs to select beams for many served terminal devices. On the other hand, some terminal devices may be moving quickly (high mobility), and the network access node may need to quickly select a beam for them. It may therefore be advantageous for the network access node to use single-symbol multi-beam measurement for those highly mobile terminal devices, since the network access node will be able to test many antenna beamforming patterns in a short period of time.

Various aspects therefore propose a network access node that adaptively optimizes the trade-off between uplink spectrum utilization versus uplink receive beamsweeping performance for a single terminal device. When network traffic is high, the network access node may lean towards uplink spectrum utilization, meaning that the network access node schedules multiple terminal devices to transmit their reference signals during the same reference signal instance (e.g., sharing the same reference signal instance with frequency multiplexing). Conversely, when network traffic is lower, the network access node may schedule empty-loaded reference signal instances for high-mobility terminal devices, meaning that a high-mobility terminal device can transmit its reference signal when the adjacent subcarriers are empty. In that case, the reference signal (e.g., SRS) will exhibit the special repeating property, and the network access mode may be able to use the single-symbol multi-beam measurement technique to quickly identify an appropriate antenna beamforming pattern.

FIG. 12 shows exemplary flow chart 1200 according to some aspects. Network access nodes may execute this procedure to selectively activate single-symbol multi-beam measurement depending on network traffic and UE mobility. In some aspects, a network access node may be configured in the manner of wireless device 600 in FIG. 6. In this case, wireless device 600 may serve a plurality of served terminal devices. This plurality of served terminal devices may be the set of terminal devices (e.g., UEs) that are in a connected state with wireless device 600. Because they are connected, wireless device 600 may schedule reference signal instances for the plurality of served terminal devices to transmit uplink reference signals (e.g., SRS) to wireless device 600. Thus, unlike the examples of FIGS. 7 and 8, wireless device 600 may control the loading of subcarriers during reference signal instances. Wireless device 600 may therefore be able to selectively activate single-symbol multi-beam measurements by scheduling only one served terminal device in a certain reference signal instance. When that happens, the served terminal device will transmit its reference signal in the reference signal instance, and the other subcarriers will be empty-loaded and introduce no ICI. Since the reference signal will exhibit the special repeating property, wireless device 600 may use the single-symbol multi-beam measurement technique to measure the reference signal in that reference signal instance.

In the example of FIG. 12, wireless device 600 may activate single-symbol multi-beam measurement when there is low network traffic. Thus, in stage 1202 controller 612 may determine a network traffic metric based on the number of served terminal devices. In some aspects, controller 612 may consider the network traffic of a co-located group of served terminal devices. For example, wireless device 600 may serve terminal devices by separating them into different groups based on their locations. Wireless device 600 may allocate some terminal devices that are in a similar location, or co-located, into a co-located group of terminal devices. Wireless device 600 may also identify terminal devices that are not near other terminal devices and may separately serve those terminal devices as non-co-located terminal devices. Wireless device 600 may use a separate antenna beamforming pattern for each non-co-located terminal device and each co-located group of terminal devices. The aforementioned tradeoff between traffic and mobility/beamsweeping speed will play a role in co-located groups of terminal devices. Because the co-located terminal devices are all near each other and served by a single antenna beamforming pattern, wireless device 600 may transmit to each on non-colliding time/frequency resources. If wireless device 600 wants to receive an empty-loaded reference signal from a given terminal device in that group, it will need to schedule the co-located group of terminal devices so that only that one terminal device transmits its reference signal during a reference signal instance. This creates the tradeoff introduced above. In some aspects, wireless device 600 may perform flow chart 1200 separately for each co-located group of served terminal devices.

Controller 612 may therefore determine the network traffic metric in stage 1202 for a co-located group of served terminal devices. In one example, the network traffic metric may be the number of terminal devices currently in the co-located group of served terminal devices.

Controller 612 may then compare the network traffic metric to a threshold stage 1204 to determine whether the network traffic is greater than a predefined level. In some aspects, higher values of the network traffic metric may indicate higher network traffic, and controller 612 may determine the network traffic is greater than the predefined level when the network traffic metric is greater than a traffic threshold (or, vice versa for other types of network traffic metrics that work the opposite way). The traffic threshold may be a predefined number of terminal devices. When the network traffic number is greater than the traffic threshold (e.g., when the number of terminal devices currently in the co-located group of served terminal devices is greater than the predefined number of terminal devices), wireless device 600 may use single-symbol single-beam measurement. In other words, when wireless device 600 is serving many terminal devices in a given group, there may be too many served terminal devices for wireless device to only schedule one per reference signal instance. Accordingly, wireless device 600 may schedule multiple terminal devices to each reference signal instance, meaning that their reference signals will suffer from ICI. The reference signals will not exhibit the special repeating property, and wireless device 600 will not be able to use single-symbol multi-beam measurement. Because the number of served terminal devices is too high, wireless device 600 may need to only use single-symbol single-beam measurement.

Accordingly, if controller 612 determines that the network traffic is above the predefined level (e.g., the network traffic metric exceeds the traffic threshold) in stage 1204, wireless device 600 may proceed to stage 1210. In stage 1210, controller 612 may schedule multiple terminal devices in the co-located group to transmit their reference signals in the same reference signal instance. Because these multiple terminal devices share the same reference signal instance, controller 612 may allocate different frequencies (e.g., subcarriers or sets of subcarriers) for each of the terminal devices. This may increase the uplink spectrum utilization. To schedule the multiple terminal devices in stage 1210, controller 612 may select the multiple terminal devices (e.g., some or all of the co-located group) and generate an uplink reference signal grant that specifies respective frequency resources in an upcoming reference signal instance. Controller 612 may then control digital transmitter 610 to transmit these uplink reference signal grants (via RF transceiver 604 and antenna array 602).

The multiple terminal devices may receive and process their respective uplink reference signal grants, and may determine that they are scheduled to transmit an uplink reference signal in the upcoming reference signal instance on their respectively assigned frequency resources. The multiple terminal devices may then transmit their respective uplink reference signals in the upcoming reference signal instance. Since this reference signal instance includes multiple reference signals, there will be ICI. Even though the reference signals are on different frequency resources, this ICI may prevent the individual reference signals from exhibiting the special repeating property.

When the reference signal instance occurs, wireless device 600 may therefore sweep only a single antenna beamforming pattern during that symbol period in stage 1212. For example, during the symbol period of the reference signal instance, controller 612 may control antenna array 602 to receive with a single antenna beamforming pattern. Digital receiver 608 may therefore receive a data stream for that single antenna beamforming pattern, and may perform radio measurements on the data stream. Because multiple terminal devices transmitted reference signals in this reference signal instance, digital receiver 608 may isolate each reference signal (e.g., isolate the subcarriers that carry each reference signal) and obtain a radio measurement for each reference signal. Each radio measurement may therefore indicate how suitable the single antenna beamforming pattern is for receiving from the terminal device that transmitted the corresponding reference signal. Additionally, because multiple terminal devices transmitted in the same reference signal instance, there may be ICI between the reference signals, meaning that wireless device 600 should not use the multi-beam techniques. Controller 612 may then repeat stages 1210-1212 using a different single antenna beamforming pattern in a later reference signal instance. Thus, controller 612 may obtain radio measurements for different antenna beamforming patterns. By repeating stages 1210-1212 with each of the antenna beamforming patterns in the plurality of antenna beamforming patterns, controller 612 may eventually obtain a radio measurement for each of the plurality of antenna beamforming patterns that maps to each of the terminal devices. After obtaining radio measurements for the plurality of antenna beamforming patterns, controller 612 may select an antenna beamforming pattern for each of the terminal devices. For example, by repeating stages 1210-1212, digital receiver 608 may obtain, for each terminal device, a radio measurement for each of the plurality of antenna beamforming patterns. Controller 612 may then select the antenna beamforming pattern for each of the terminal devices by identifying the antenna beamforming pattern that produced the highest radio measurement when measuring reference signals from that terminal device.

Thus, when there is high network traffic, wireless device 600 may schedule multiple terminal devices in a reference signal instance and sweep only a single antenna beamforming pattern during that reference signal instance. In the alternative case, controller 612 may determine in stage 1204 that the network traffic metric indicates the network traffic is less than a predefined level (e.g., that the network traffic metric is less than the traffic threshold). Controller 612 may then loop over the terminal devices in the co-located group and determine whether to use single-symbol multi-beam measurement for any of them. As shown in FIG. 12, controller 612 may determine a mobility metric for a first terminal device UE(i). Controller 612 may determine the mobility metric based on how much the first terminal device is moving. In some aspects, terminal devices that are moving rapidly and/or often may generally have higher mobility metrics than those that are not moving, or that are moving infrequently. For instance, these mobility metrics may represent the level that a terminal device is moving. In other aspects, the mobility metric may work the opposite way, and may have high values when the terminal device is not moving. This depends on the type of mobility metric used. In either case, the value of the mobility metric indicates the degree to which the terminal device is moving.

In some aspects, controller 612 may determine the mobility metric based on fluctuation levels of UE-reported channel state information. Examples of channel state information include channel quality indicators (CQI), precoding matrix indicator (PMI), or reference signal receive power (RSRP). Terminal devices may report their channel state information to wireless device 600, and controller 612 may use the channel state information to evaluate the wireless channel between wireless device 600 and the terminal devices. For the first terminal device, controller 612 may determine the mobility metric based the fluctuations in one or more of the channel state information types. In one example, controller 612 may determine the mobility metric based on the difference in maximum and minimum values of a channel state information (e.g., CQI, PMI, or RSRP) over a predefined window of time, or based on the variance in values of a channel state information over the predefined window of time. In some aspects, controller 612 may combine this difference and/or variance between different types of channel state information (e.g., a weighted combination) to obtain the mobility metric for the first terminal device.

In another example, controller 612 may determine the mobility metric in stage 1206 based on location change information. For instance, the first terminal device may be operating in parallel with a cellular-based positioning application, such as Observed Time Difference of Arrival (OTDOA). In that case, the first terminal device may determine its geographic location with OTDOA based on signals received from different network access nodes. The first terminal device may then report its geographic location to wireless device 600 (or to another network-side component that forwards the geographic location to wireless device 600). Controller 612 may then determine the first terminal device's mobility metric based on how much its geographic location is changing. For example, controller 612 may determine the mobility metric as the change in consecutive geographic locations, or as the variance in geographic location over a predefined time window.

Controller 612 may then compare the mobility metric to a mobility threshold in stage 1208 to determine whether the device's mobility is greater than a predefined level. In aspects where higher mobility metrics indicate more mobility, controller 612 may determine the device mobility is greater than the predefined level when the mobility metric is greater than the mobility threshold (and vice versa for mobility metrics that are higher when device mobility is low) For example, controller 612 may determine whether the difference between the minimum and maximum values of a channel state information (over a predefined time window) is greater than a difference threshold, or whether the variance of values of a channel state information (in a predefined time window) is greater than a variance threshold. Alternatively, controller 612 may determine whether the difference in consecutive geographic locations is greater than a difference threshold, or whether the variance in geographic location (over a predefined time window) is greater than a variance threshold. This comparison may therefore depend on the type of mobility metric used. In any case, the mobility metric may be based on the movement of the first terminal device, and controller 612 may determine whether the mobility metric indicates device mobility greater than a predefined level in stage 1208.

If controller 612 determines that the mobility metric for the first terminal device is less than the mobility threshold, controller 612 may proceed to stage 1210. In other words, this means that the first terminal device is not highly mobile, and so wireless device 600 does not need to use single-symbol multi-beam measurement to find an appropriate antenna beamforming pattern very quickly. Because wireless device 600 does not need to beamsweep the first terminal device quickly, wireless device 600 can schedule its uplink reference signals in the same reference signal instance as other terminal devices and can use single-symbol single-beam measurement.

Conversely, if controller 612 determines that the mobility metric for the first terminal device is greater than the mobility threshold, controller 612 may proceed to stage 1214. In this case, the first terminal device is highly mobile, so it can be advantageous for wireless device 600 to reduce the beamsweeping time by using single-symbol multi-beam measurement. Accordingly, in stage 1214 controller 612 may schedule the first terminal device to transmit its reference signal during a reference signal instance that is empty-loaded. In other words, controller 612 may schedule the first terminal device to transmit its reference signal in a reference signal instance in which no other terminal devices are scheduled to transmit. This means the subcarriers around the reference subcarrier signals will be empty, and there will be no ICI on the reference signal from the first terminal device. As a result, the reference signal from the first terminal device will have the special repeating property. Like described for stage 1210, controller 612 may schedule the first terminal device may sending an uplink reference signal grant that assigns the first terminal device to transmit its uplink signal on certain frequency resources in the reference signal instance.

In some aspects, controller 612 may schedule the first terminal device to transmit its reference signal with a high subsampling rate. High subsampling rates mean a high number of repetitions, and so wireless device 600 can measure more antenna beamforming patterns in one symbol period when the subsampling rate is high. In the example of SRS for 5G NR, controller 612 may schedule the first terminal device to use comb-4 SRS, meaning there will be four repetitions in the reference signal instance. In this case, wireless device 600 can measure up to four antenna beamforming patterns.

Wireless device 600 may then control antenna array 602 to sweep between multiple antenna beamforming patterns to receive the reference signal from the first terminal device.

Controller 612 may therefore identify the time points where the repetitions occur and then control antenna array 602 to switch among the multiple antenna beamforming patterns at those time points. Digital receiver 608 may receive the resulting data stream (via RF transceiver 604), where the data stream includes multiple substreams that each correspond to one of the multiple antenna beamforming patterns. Digital receiver 608 may perform a radio measurement on each substream to obtain a radio measurement for each of the multiple antenna beamforming patterns.

Controller 612 may then repeat stages 1214 and 1216 for the first terminal device. In other words, controller 612 may schedule only the first terminal device to transmit its reference signal during one or more additional reference signal instances. Controller 612 may then sweep between a different set of multiple antenna beamforming patterns in each of the one or more additional reference signal instances, and digital receiver 608 may obtain a radio measurement for each. By repeating stages 1214 and 1216, controller 612 may obtain radio measurements for all of the plurality of antenna beamforming patterns. Controller 612 may then select an antenna beamforming pattern from the plurality based on the radio measurements (e.g., the antenna beamforming pattern with the highest radio measurement). Controller 612 may then control antenna array 602 to receive from the first terminal device with that antenna beamforming pattern.

Controller 612 may also repeat the procedure of stages 1206-1216 for the other terminal devices in the co-located group, treating each as the first terminal device described above. Controller 612 may therefore obtain radio measurements for high-mobility terminal devices with single-symbol multi-beam measurements (stage 1216), and obtain measurement for non-high-mobility terminal devices with single-symbol single beam measurements (stage 1212). Because there are a limited number of reference signal instances, in some aspects controller 612 may alternate which terminal devices it performs measurements on. For example, controller 612 may schedule one reference signal instance for performing single-symbol multi-beam measurements for one high-mobility terminal device, and may then schedule the next reference signal instance for performing single-symbol single-beam measurements for multiple non-high mobility terminals.

Accordingly, as FIG. 12 describes, network access nodes may also utilize single-symbol multi-beam measurement to speed up beamsweeping. Because the network access nodes can control the loading of subcarriers around reference subcarrier signals, they can selectively schedule empty-loaded reference signal instances during which to activate single-symbol multi-beam measurement. The network access nodes can thus measure multiple antenna beamforming patterns without losing measurement sensitivity from ICI.

While the above examples were directed to receive beamsweeping, other aspects may use single-symbol multi-beam measurement for transmit beamsweeping. In transmit beamsweeping, wireless device 600 may transmit a reference signal to a receive device with antenna array 602 set to a first antenna beamforming pattern. The receive device may perform a first radio measurement for the first antenna beamforming pattern. Wireless device 600 may then set antenna array 602 to a second antenna beamforming pattern and transmit the reference signal again. The receive device may then perform a second radio measurement for the second antenna beamforming pattern. Wireless device 600 may continue transmitting the reference signal with different antenna beamforming patterns until it has transmitted the reference signal with each of a plurality of antenna beamforming patterns (that it is considering for transmitting to the receive device). The receive device may perform radio measurements for each antenna beamforming pattern. The receive device may then report the beamsweeping results back to wireless device 600. In one example, the receive device may send a report that identifies which antenna beamforming pattern produced the highest radio measurement. Wireless device 600 may then use that antenna beamforming pattern to transmit to the receive device.

Figure 13:
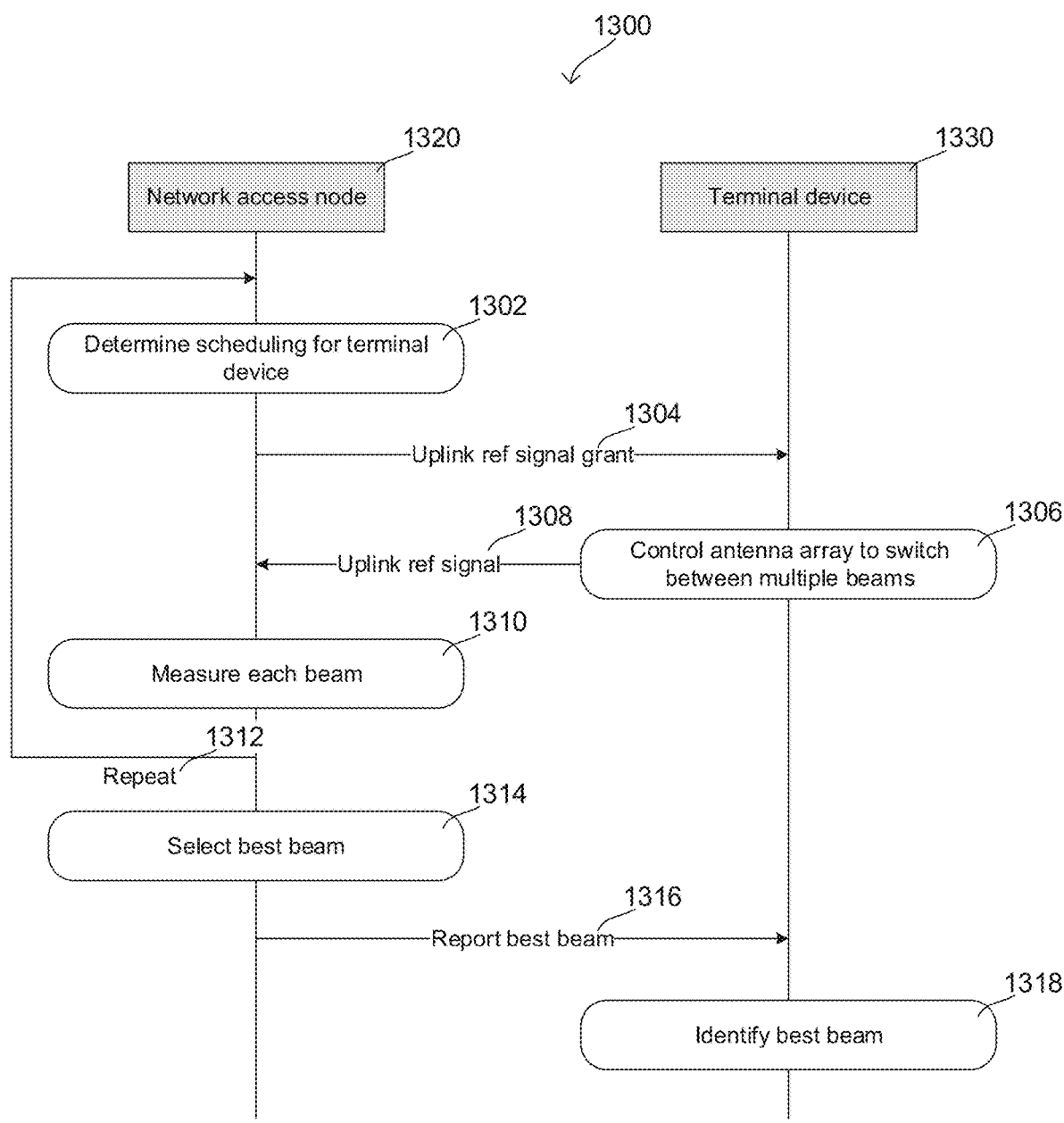
FIG. 13 shows an exemplary message sequence chart for a terminal device to perform single-symbol multi-beam measurements for transmit beamsweeping according to some aspects.
Figure 14:
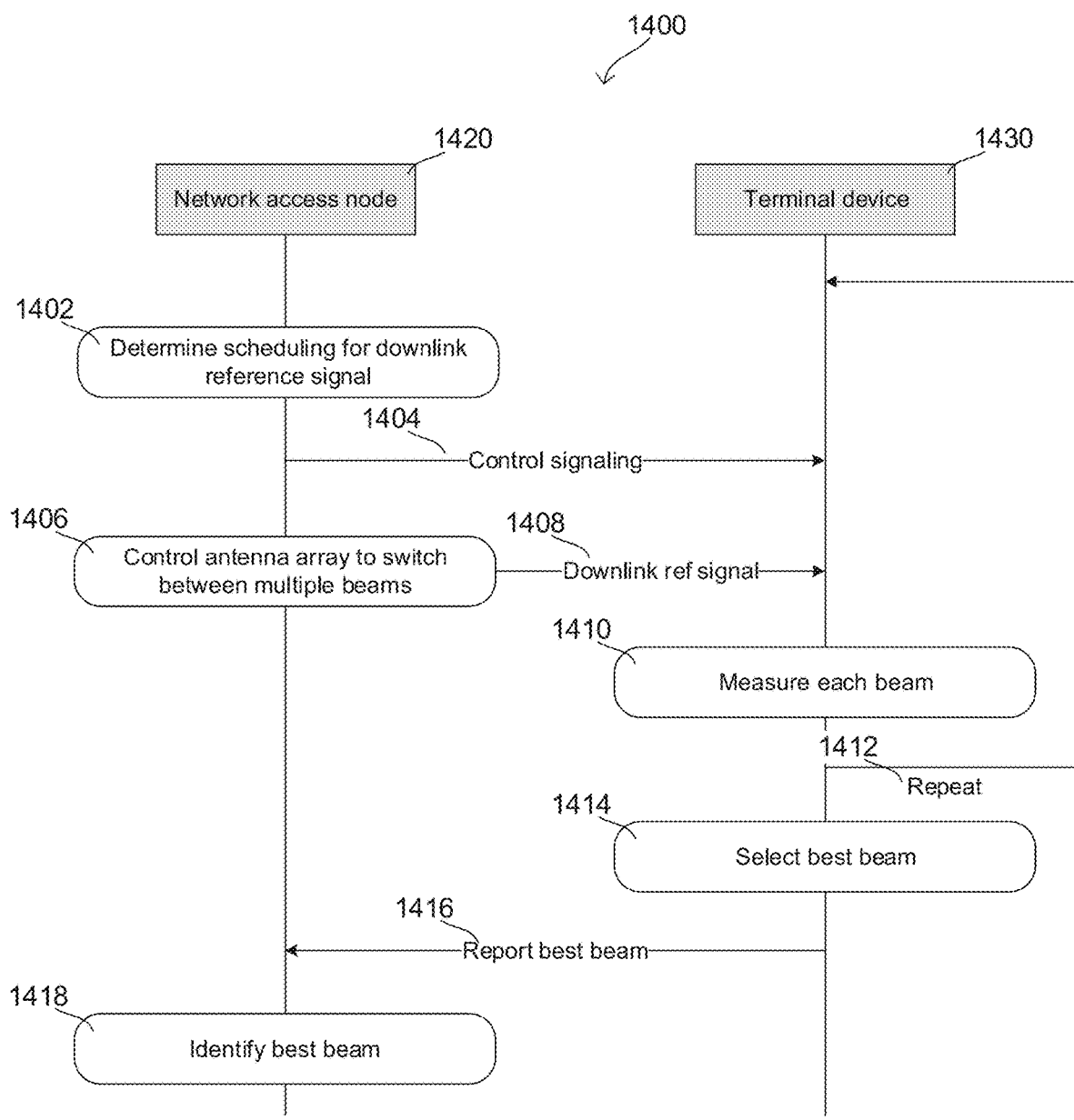
FIG. 14 shows an exemplary message sequence chart for a network access node to perform single-symbol multi-beam measurements for transmit beamsweeping according to some aspects.

Various aspects of this disclosure use single-symbol multi-beam measurement with this type of transmit beamsweeping. FIG. 13 shows an example for transmit beamsweeping at a terminal device, while FIG. 14 shows an example for transmit beamsweeping at a network access node. Starting first with FIG. 13, network access node 1320 and terminal device 1330 may perform the procedure of message sequence chart 1300. Network access node 1320 and terminal device 1330 may both be configured in the manner of wireless device 600, and may perform each of stages 1302-1318 using the components described in the above examples.

In stage 1302, network access node 1320 may first determine scheduling for terminal device 1330 to transmit an uplink reference signal. In FIG. 13's example, network access node 1320 (e.g., its controller) may decide to schedule terminal device 1330 to transmit an empty-loaded reference signal. Because there will be low ICI, this will allow terminal device 1300 to transmit its reference signal while switching between multiple antenna beamforming patterns. In some aspects, network access node 1320 may determine whether there is high network traffic and, if not, decide to schedule terminal device 1330 to transmit an empty-loaded reference signal. In some aspects, network access node 1320 may determine that terminal device 1330 is high-mobility, and may then decide to schedule terminal device 1330 to transmit an empty-loaded reference signal. In any case, network access node 1320 may decide to schedule terminal device 1300 to transmit an empty-loaded reference signal during a reference signal instance.

Network access node 1320 may then transmit (e.g., with its controller and digital transmitter) an uplink reference signal grant to terminal device 1330 in stage 1304. The uplink reference signal grant may schedule terminal device 1330 to transmit an uplink reference signal in the reference signal instance (e.g., on certain frequency resources). Network access node 1320 may schedule no other terminal devices to transmit during that same reference signal instance, thus avoiding ICI and preserving the special repeating property of the uplink reference signal. Network access node 1320 may specify parameters for the uplink reference signal, such as the SRS scheduling parameter comb-4 or comb-2. This scheduling parameter controls the sub sampling rate, and thus determines how many repetitions the uplink reference signal will have in the reference signal instance.

Terminal device 1330 may receive the uplink reference signal grant and determine that it is scheduled to transmit an uplink reference signal in the reference signal instance. Terminal device 1330 may also determine the number of repetitions based on the scheduling parameter (e.g., comb-4 or comb-2), and may then identify the time points where the uplink reference signal will repeat itself. When the reference signal instance occurs, terminal device 1330 may control its antenna array to switch among multiple antenna beamforming patterns at the time points in stage 1306. Thus, terminal device 1330 may transmit the uplink reference signal in stage 1308.

Network access node 1320 may receive the uplink reference signal and perform a radio measurement on each antenna beamforming pattern in stage 1310. For example, network access node 1320 may also identify the time points where the uplink reference signal repeats itself, and may separate (e.g., with its digital receiver) the received uplink reference signal into separate substreams that each align with a respective repetition. Network access node 1320 may then perform a radio measurement on each substream to obtain a radio measurement for the antenna beamforming pattern that terminal device 1330 aligned with that repetition. Network access node 1320 may therefore obtain a radio measurement for each antenna beamforming pattern.

Network access node 1320 and terminal device 1330 may repeat this procedure in stage 1312. For instance, network access node 1320 and terminal device 1330 may repeat this procedure for additional reference signal instances until terminal device 1330 has transmitted the reference signal with each of a plurality of antenna beamforming patterns. In some aspects, terminal device 1330 may transmit signaling to network access node 1320 that indicates when terminal device 1330 has transmitted the reference signal with each of a plurality of antenna beamforming patterns.

After this is done, network access node 1320 may have a radio measurement for each of the plurality of antenna beamforming patterns. Network access node 1320 may then select an antenna beamforming pattern in stage 1314. For example, network access node 1320 may identify which repetition, out of all of the reference signal instances, produced the highest radio measurement (or, equivalently, which substream of a reference signal instance). In some aspects, network access node 1320 may not know which antenna beamforming pattern was used by terminal device 1330 in each repetition, and so may only be able to identify which repetition produced the highest radio measurement.

Network access node 1320 may then report the results back to terminal device 1330 in stage 1316. For example, network access node 1320 may send signaling (e.g., with its controller and digital transmitter) that identifies the repetition and reference signal instance that produced the highest radio measurement. Terminal device 1330 may then identify an antenna beamforming pattern in stage 1318 based on the reported results. For instance, terminal device 1330 may identify which antenna beamforming pattern was used for the repetition and reference signal instance indicated in the results. Terminal device 1330 may select that as the antenna beamforming pattern in stage 1318, and may then control its antenna array to transmit signals to network access node 1320 with that antenna beamforming pattern.

With this procedure, terminal device 1330 may select a transmit antenna beamforming pattern using single-symbol multi-beam measurement. Because network access node 1320 schedules only terminal device 1330 to transit its uplink reference signal in the reference signal instances, the uplink reference signal may have the special repeating property. Thus, network access node 1320 can measure each antenna beamforming pattern by measuring one of the repetitions. Since the repetitions are ICI-free, network access node 1320 may not lose measurement sensitivity.

Turning next to FIG. 14, message sequence chart 1400 shows an example where network access node 1420 and terminal device 1430 use single-symbol multi-beam measurement for transmit beamsweeping at network access node 1420. In this case, network access node 1420 may sweep between multiple antenna beamforming patterns while transmitting downlink reference signals to terminal device 1430. Because network access node 1420 controls the downlink scheduling, network access node 1420 may schedule its downlink reference signals to be empty-loaded (e.g., where the other subcarriers do not carry any data). Thus, the downlink reference signals may be free of ICI, and terminal device 1430 may be able to measure each antenna beamforming pattern from an identical repetition in the downlink signal waveform. Network access node 1420 and terminal device 1430 may both be configured in the manner of wireless device 600, and may perform each of stages 1402-1418 using the components described in the above examples.

As FIG. 14 shows, network access node 1420 may first determine scheduling for the downlink reference signal (e.g., CSI-RS) in stage 1402. In some aspects, network access node 1420 may determine that there is low network traffic, and therefore decide to use single-symbol multi-beam measurement to select a transmit antenna beamforming pattern for terminal device 1430. In some aspects, network access node 1420 may determine that terminal device 1430 is high-mobility, and therefore decide to use single-symbol multi-beam measurement to select a transmit antenna beamforming pattern for terminal device 1430. Network access node 1420 may therefore determine a downlink schedule that allocates an empty-loaded downlink reference signal in a reference signal instance (e.g., does not allocate any data other than the downlink reference signal).

Network access node 1420 may then send to terminal device 1430 control signaling that identifies the scheduling of the downlink reference signal. In various aspects, network access node 1420 may schedule the downlink reference signal with a periodic, semi-persistent, or aperiodic schedule. In any case, terminal device 1430 may be able to determine the symbol period and subcarriers on which the downlink reference signal is scheduled. Network access node 1420 may also indicate a scheduling parameter that indicates the subsampling rate, such as the CSI-RS scheduling parameter D. Since this controls the number of repetitions in the reference signal instance, terminal device 1430 may also be able to determine the time points in the reference signal instance where the downlink reference signal will repeat itself.

Once the scheduled reference signal instance occurs, network access node 1420 may control its antenna array to switch among multiple antenna beamforming patterns in stage 1406 while transmitting the downlink reference signal in stage 1408. Network access node 1420 may align the switches with the time points where the downlink reference signal repeats itself in time.

Terminal device 1430 may receive the downlink reference signal during the reference signal instance. Terminal device 1430 may identify the time points where the downlink reference signal repeats itself and then separate the received downlink reference signal into separate substreams for each repetition. Terminal device 1430 may then perform a radio measurement on each substream, thus obtaining a radio measurement for each of the multiple antenna beamforming patterns.

Network access node 1420 and terminal device 1430 may then repeat this procedure in stage 1412. For example, network access node 1420 may schedule downlink reference signals for additional reference signal instances, and may transmit with multiple antenna beamforming patterns in the additional reference signal instances until it has transmitted with each of a plurality of antenna beamforming patterns. By measuring each repetition of the reference signal instances, terminal device 1430 may obtain a radio measurement for each of the plurality of antenna beamforming patterns. In some aspects, terminal device 1430 may not know specifically which antenna beamforming pattern was used by network access node 1420 to transmit in each repetition. Thus, terminal device 1430 may obtain radio measurements for each repetition in the reference signal instances, where each repetition corresponds to one of the plurality of antenna beamforming patterns.

Terminal device 1430 may then select an antenna beamforming pattern in stage 1414. For example, terminal device 1430 may identify the repetition, out of all of the reference signal instances, that produced the highest radio measurement. Terminal device 1430 may then report this result back to network access node 1420 in stage 1416, such as by identifying the repetition and reference signal instance that produced the highest radio measurement. Based on this information, network access node 1420 may identify the antenna beamforming pattern that produced the highest radio measurement in stage 1418. Network access node 1420 may then use that antenna beamforming pattern to transmit to terminal device 1430.

By using the procedure of message sequence chart 1400, network access node 1420 may select a transmit antenna beamforming pattern with beamsweeping that uses single-symbol multi-beam measurement at terminal device 1430. Network access node 1420 may therefore reduce the transmit beamsweeping time without harming measurement sensitivity at terminal device 1430.

Some aspects may use additional practical considerations to render them more suitable for product implementation. For example, real-life devices may be limited in how quickly they can switch antenna beamforming patterns. Using wireless device 600 as an example, it may take 50-100 nanoseconds for controller 612 to switch antenna array 602 from a first to a second antenna beamforming pattern. This switching latency creates a time-gap during which wireless device 600 cannot receive data. Since the waveform repetitions of the reference signal are not protected by a cyclic prefix or guard period, wireless device 600 may lose data when it tries to switch to a new antenna beamforming pattern for each repetition.

In many cases, this data distortion and loss may be manageable, especially when wireless device 600 has a high-performance RF system. Even in the most challenging 5G NR case with 120 kHz subcarrier spacing and 12 repetitions per reference subcarrier signal (e.g., CSI-RS with D=1), each repetition of the reference signal is still 700 nanoseconds long. This is much higher than the 50-100 nanosecond switching gap. Because the SNR drop from signal distortion during the switching gap will be less than 0.5 dB, wireless device 600 may be able to tolerate the switching gap. Accordingly, wireless device 600 may still switch antenna beamforming patterns (for transmit or receive beamsweeping) for each repetition of the reference signal in a reference signal instance.

In other cases, the switching gap may cause too much of an SNR drop for wireless device 600 to switch antenna beamforming patterns in each repetition. This happen, for example, when wireless device 600 has a low-cost RF, or when another cellular standard has reference signals with much shorter repetitions. In these cases, wireless device 600 may alternate between beamsweeping repetitions and switching repetitions within a given reference signal instance. Wireless device 600 may transmit or receive during the beamsweeping repetitions, and then switch antenna beamforming patterns during the switching repetitions. In other words, wireless device 600 may use the switching repetitions as a guard interval during which it can switch antenna beamforming patterns.

Figure 15:
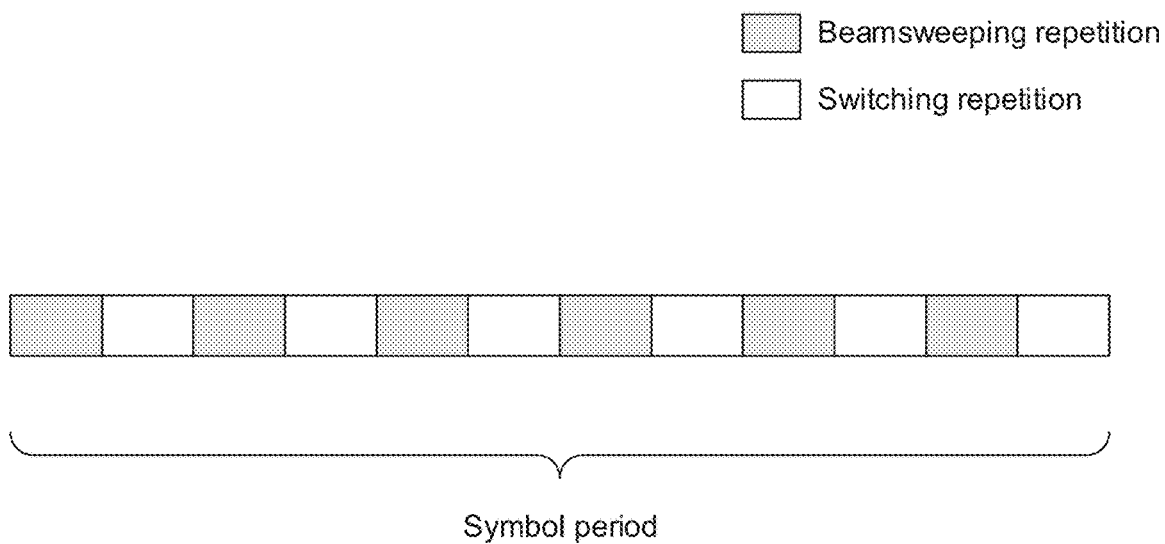
FIG. 15 shows an example of alternating between beam-sweeping and switching repetitions when using single-symbol multi-beam measurement according to some aspects.

FIG. 15 shows an example where the symbol period of a reference signal instance includes 12 repetitions (e.g., D=1 for CSI-RS). Wireless device 600 may alternate each of the repetitions between a beamsweeping repetition and a switching repetition. Accordingly, wireless device 600 may transmit or receive (depending on the type of beamsweeping) with a first antenna beamforming pattern during the first beamsweeping repetition. The next repetition is then the first switching repetition. During that first switching repetition, wireless device 600 may control antenna array 602 to switch to a second antenna beamforming pattern. This introduces the switching gap, during which controller 612 may provide control signaling to phase shifters in antenna array 602 to switch to the second antenna beamforming pattern. This switching gap is shorter than the first switching repetition. By the time the second beamsweeping repetition starts, antenna array 602 will be set to the second antenna beamforming pattern. Wireless device 600 may then transmit or receive during the second beamsweeping repetition. Wireless device 600 may then use the next repetition as the second switching repetition, and may switch antenna array 602 from the second antenna beamforming pattern to a third antenna beamforming pattern. Wireless device 600 may then be ready to transmit or receive with the third antenna beamforming pattern when the third beamsweeping repetition starts.

Wireless device 600 may use a similar technique for other numbers of repetitions, such as two beamsweeping repetitions and two switching repetitions when the reference signal repeats itself four times in a reference signal instance. Although this technique reduces the number of antenna beamforming patterns that wireless device 600 can test in a single reference signal instance, it increases the time margin for beamsweeping transition (e.g., up to 700 nanoseconds for the 12-repetition case of CSI-RS). Even if wireless device 600 has a very poor RF, it will still be able to switch antenna beamforming patterns in the switching repetitions. Moreover, wireless device 600 will still be able to reduce the beamsweeping time, since it will still be able to test multiple antenna beamforming patterns in a single symbol period.

Another practical consideration is the frequency allocation of reference signals within a wideband carrier. In some cases, the reference signals may be empty-loaded in some parts of the carrier, but may be allocated near other signals in other parts of the carrier. FIG. 16 shows an example of this according to some aspects. In FIG. 16's example, the middle section of the wideband carrier (or, similarly, the middle part of a bandwidth part (BWP) for 5G NR) may only contain a reference signal in a given reference signal instance. In this section of the wideband carrier, the reference signal will be empty-loaded, and the subcarriers around the reference subcarrier signals will not carry any data. This section is referred to herein and the reference signal subband. However, the outer sections of the wideband carrier may carry other data. While the reference subcarrier signals in the center of the middle section may not suffer from ICI, the other data in these other subbands may cause ICI to the reference subcarrier signals at the edges of the middle section. Even if wireless device 600 isolates only the RBs in the reference signal subband for a radio measurement, that ICI from the other subbands may still leak onto the outer reference subcarrier signals and corrupt the radio measurement. This scenario can happen regardless of which section of the wideband carrier (or BWP) contains the reference signal and which section contains the other data.

Accordingly, in some aspects wireless device 600 may null reference subcarrier signals (e.g., null those subcarriers) near the edge of the reference signal subband. While wireless device 600 may not be able to include those nulled reference subcarrier signals in the radio measurement, wireless device 600 may eliminate the ICI. Even though there may be a small measurement sensitivity loss, wireless device 600 may still perform a radio measurement (e.g., RSRP or another signal power measurement for beamsweeping) that is unbiased and functional.

When wireless device 600 is a terminal device that performs beamsweeping, wireless device 600 may have two options for performing the nulling. Since wireless device 600 will not know the frequency allocation of the subbands adjacent to the reference signal, wireless device 600 may not be able to directly determine whether the other subbands will cause ICI (e.g., whether they contain data or are empty-loaded). In a first option, the reference signal resource allocation may be static. For example, RRC signaling may configure a static resource allocation for the reference signal (e.g., CSI-RS). Wireless device 600 may then always null the subcarriers carrying the reference subcarrier signals at the edge of the reference signal subband for that reference signal (e.g., for that particular CSI-RS resource). For instance, after digital receiver 608 performs an FFT on received data to obtain the frequency-domain signal, digital receiver 608 may set subcarriers at the edge of the reference signal subband to zero, thus nulling them. In this first option, digital receiver 608 may always null these same edge subcarriers, thus eliminating ICI when it is present. Digital receiver 608 may then perform the radio measurement (for the current antenna beamforming pattern) with the reference signal subband, including the nulled subcarriers.

In the second option, wireless device 600 may use any of the load detection techniques described above, like for stage 702 in FIG. 7. For example, wireless device 600 can use historical radio measurements on the other subbands to predict whether those other subbands will be empty-loaded during an upcoming reference signal instance. If so, then wireless device 600 may not null the edge subcarriers, since the historical radio measurements indicate that the other subbands will be empty-loaded. Conversely, if the historical radio measurements indicate that the other subbands will not be empty-loaded in the upcoming reference signal instance, wireless device 600 may null the edge subcarriers. Wireless device 600 may then perform the radio measurement (for the current antenna beamforming pattern) with the reference signal subband, including the nulled subcarriers. In other words, wireless device 600 may predict when the other subbands are not empty-loaded, and if so may null reference subcarrier signals near the edges of the reference signal subband that likely suffer from ICI.

Figure 17:
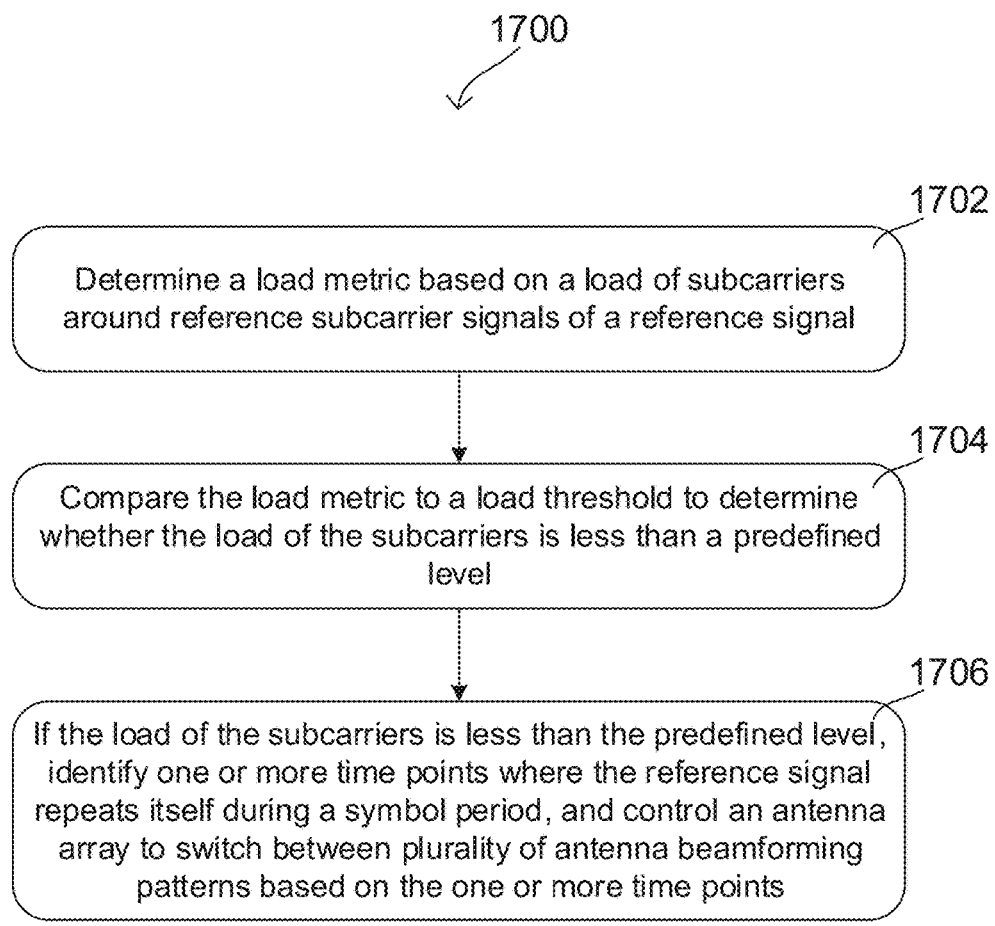
FIGS. 17-20 show exemplary methods of performing wireless communications at a wireless device according to some aspects.

FIG. 17 shows exemplary method 1700 of performing wireless communications at a wireless device according to some aspects. As shown in FIG. 17, method 1700 includes determining a load metric based on a load of subcarriers around reference subcarrier signals of a reference signal (1702), comparing the load metric to a load threshold to determine whether the load of the subcarriers is less than a predefined level, and if the load of the subcarriers is less than the predefined level (1704), identifying at least one time point where the reference signal repeats itself during a symbol period, and controlling an antenna array to switch among the plurality of antenna beamforming patterns based on the at least one time point (1706).

Figure 18:
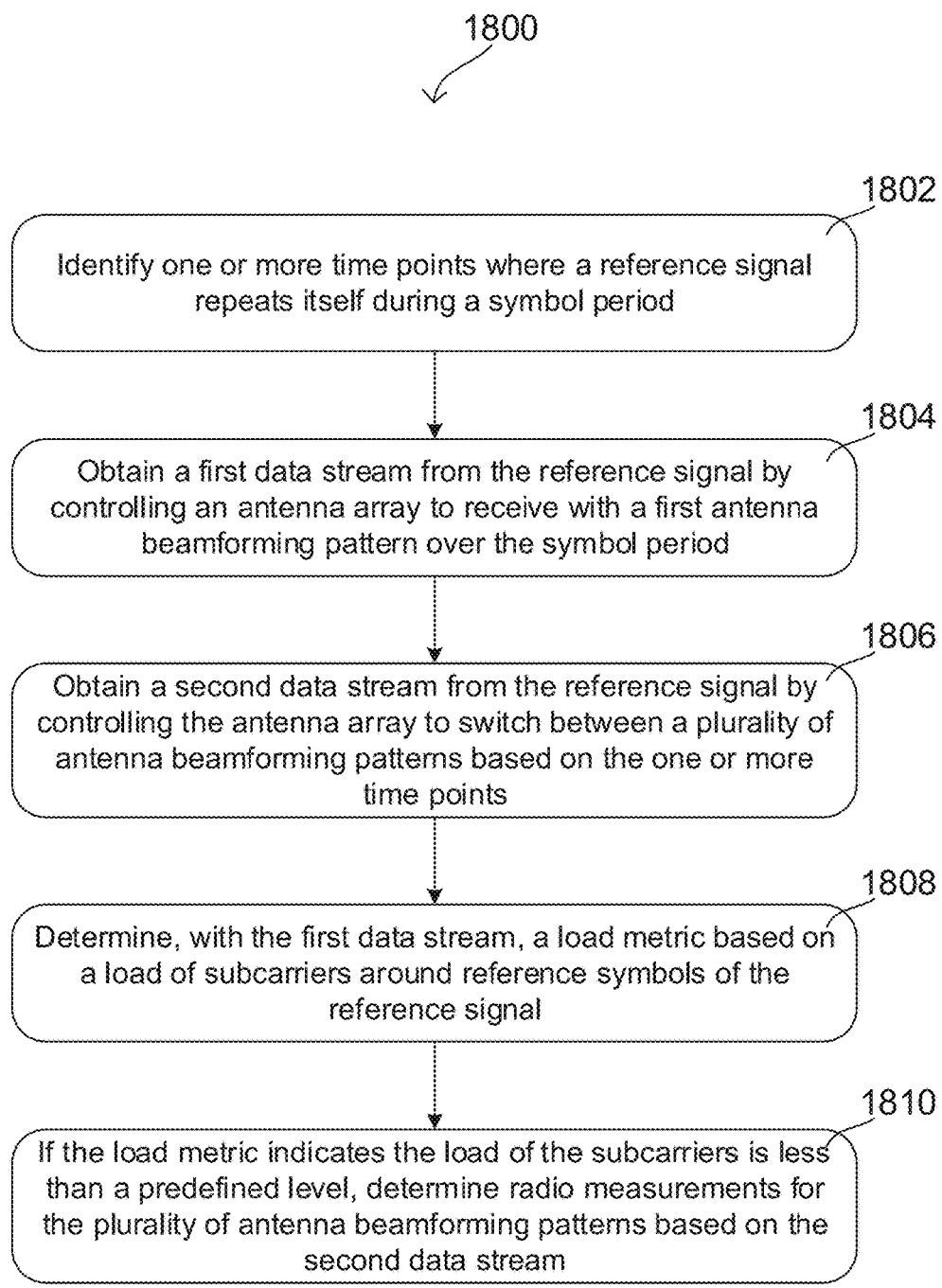

FIG. 18 shows exemplary method 1800 of performing wireless communications at a wireless device according to some aspects. As shown in FIG. 18, method 1800 includes identifying at least one time point where a reference signal repeats itself during a symbol period (1802), obtaining a first data stream from the reference signal by controlling an antenna array to receive with a first antenna beamforming pattern over the symbol period (1804), obtaining a second data stream from the reference signal by controlling the antenna array to switch among a plurality of antenna beamforming patterns based on the at least one time point (1806), determining, with the first data stream, a load metric based on a load of subcarriers around reference subcarrier signals of the reference signal (1808), and if the load metric indicates the load of the subcarriers is less than a predefined level, determining radio measurements for the plurality of antenna beamforming patterns based on the second data stream (1810).

Figure 19:
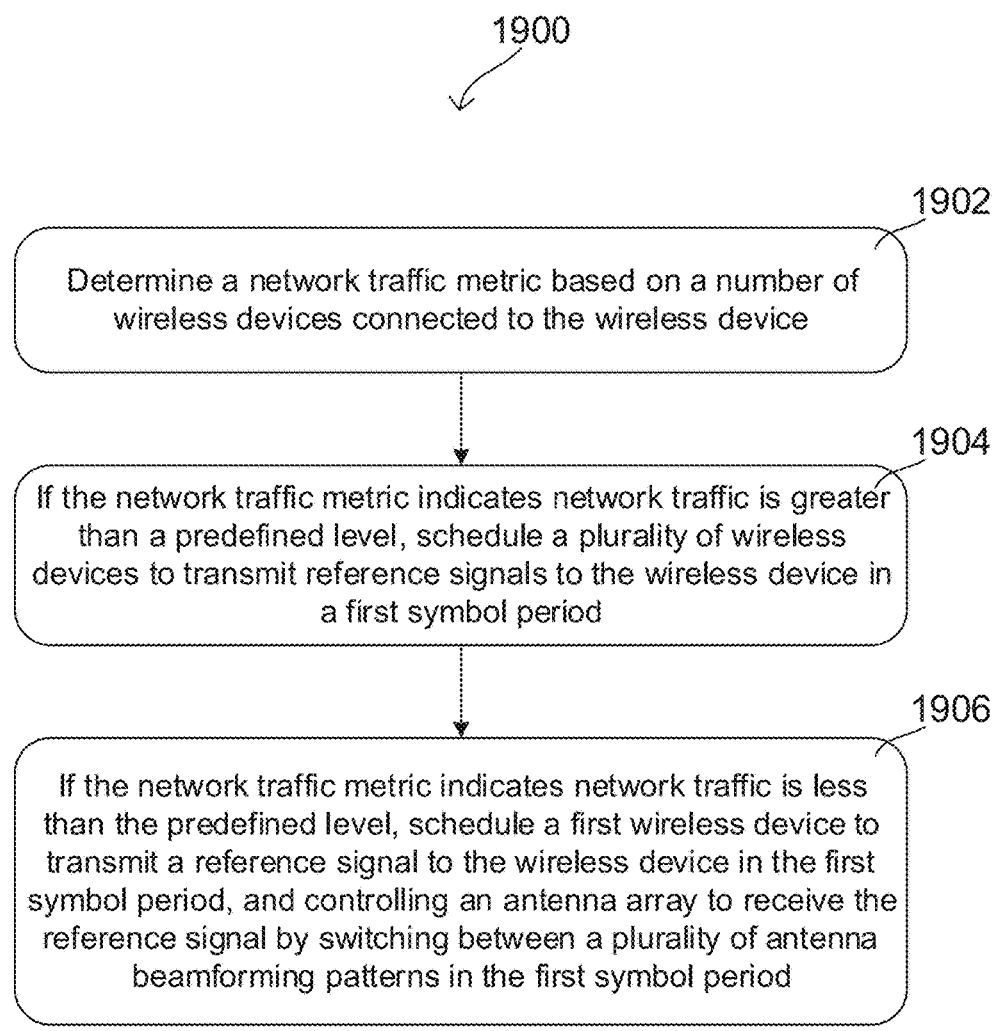

FIG. 19 shows exemplary method 1900 of performing wireless communications at a wireless device according to some aspects. As shown in FIG. 19, method 1900 includes determining a network traffic metric based on a number of wireless devices connected to the wireless device (1902), if the network traffic metric indicates network traffic is greater than a predefined level, scheduling a plurality of wireless devices to transmit reference signals to the wireless device in a first symbol period (1904), and if the network traffic metric indicates network traffic is less than the predefined level, scheduling a first wireless device to transmit a reference signal to the wireless device in the first symbol period, and controlling an antenna array to receive the reference signal by switching between a plurality of antenna beamforming patterns in the first symbol period (1906).

Figure 20:
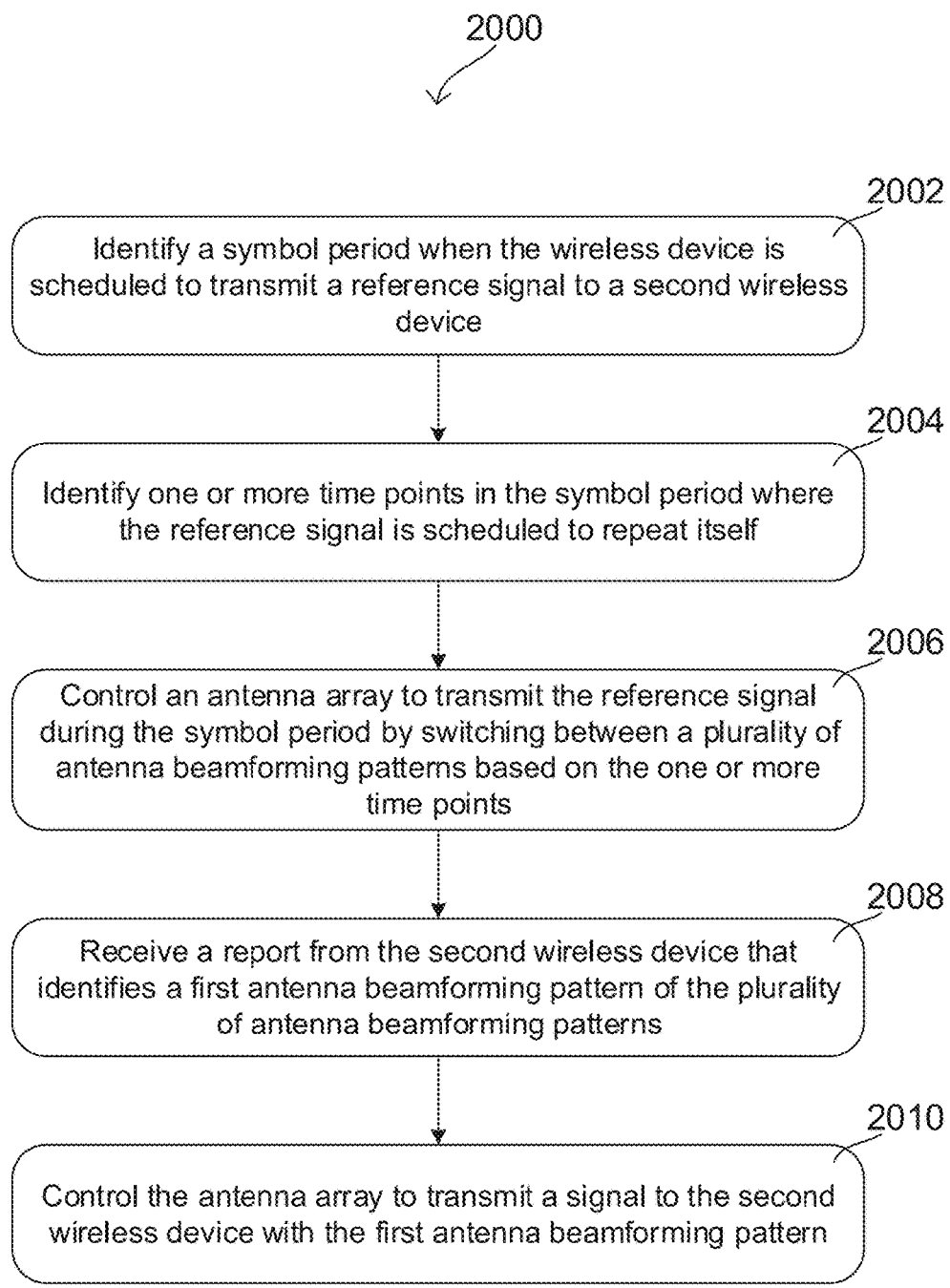

FIG. 20 shows exemplary method 2000 of performing wireless communications at a wireless device according to some aspects. As shown in FIG. 20, method 2000 includes identifying a symbol period when the wireless device is scheduled to transmit a reference signal to a second wireless device (2002), identifying at least one time point in the symbol period where the reference signal is scheduled to repeat itself (2004), controlling an antenna array to transmit the reference signal during the symbol period by switching between a plurality of antenna beamforming patterns based on the at least one time point (2006), receiving a report from the second wireless device that identifies a first antenna beamforming pattern of the plurality of antenna beamforming patterns (2008), and controlling the antenna array to transmit a signal to the second wireless device with the first antenna beamforming pattern (2010).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples are directed to further aspects of this disclosure:

Example 1 is a method of performing wireless communications at a wireless device, the method including determining a load metric based on a load of subcarriers around reference subcarrier signals of a reference signal, comparing the load metric to a load threshold to determine whether the load of the subcarriers is less than a predefined level, and if the load of the subcarriers is less than the predefined level, identifying at least one time point where the reference signal repeats itself during a symbol period, and controlling an antenna array to switch among the plurality of antenna beamforming patterns based on the at least one time point.

In Example 2, the subject matter of Example 1 can optionally further include receiving the reference signal over a plurality of reference signal instances, wherein determining the load metric based on the load of the subcarriers includes determining a plurality of load metrics based on the reference signal in the plurality of reference signal instances, and determining the load metric based on the plurality of load metrics.

In Example 3, the subject matter of Example 2 can optionally include wherein determining the load metric based on the plurality of load metrics includes determining the load metric based on an average of the plurality of load metrics.

In Example 4, the subject matter of any one of Examples 1 to 3 can optionally include wherein determining the plurality of load metrics includes determining a ratio of a power of the reference subcarrier signals to a power of the subcarriers around the reference subcarrier signals in the symbol period.

In Example 5, the subject matter of any one of Examples 1 to 4 can optionally include wherein determining the plurality of load metrics includes determining a reference signal receive quality (RSRQ) measurement.

In Example 6, the subject matter of any one of Examples 1 to 5 can optionally further include receiving data from the antenna array for the symbol period, wherein the data includes a first substream from when the antenna array is set to a first antenna beamforming pattern and further includes a second substream from when the antenna array is set to a second antenna beamforming pattern.

In Example 7, the subject matter of Example 6 can optionally further include obtaining a first radio measurement for the first antenna beamforming pattern based on the first substream and obtaining a second radio measurement for the second antenna beamforming pattern based on the second substream.

In Example 8, the subject matter of any one of Examples 1 to 6 can optionally further include receiving data from the antenna array for the symbol period, obtaining radio measurements for the plurality of antenna beamforming patterns based on the data, and selecting an antenna beamforming pattern from the plurality of antenna beamforming patterns based on the radio measurements.

In Example 9, the subject matter of Example 8 can optionally further include controlling the antenna array to receive data with the antenna beamforming pattern.

In Example 10, the subject matter of any one of Examples 1 to 9 can optionally include wherein the reference subcarrier signals form a plurality of identical repetitions over time in the symbol period, and wherein controlling the antenna array to switch among the plurality of antenna beamforming patterns based on the at least one time point includes controlling the antenna array to set to a different antenna beamforming pattern during each of the plurality of identical repetitions.

In Example 11, the subject matter of Example 10 can optionally include wherein the at least one time point correspond to starting points or ending points of the plurality of repetitions.

In Example 12, the subject matter of any one of Examples 1 to 11 can optionally include wherein the reference subcarrier signals are evenly spaced in frequency.

In Example 13, the subject matter of any one of Examples 1 to 12 can optionally include wherein identifying the one or time points where the reference signal repeats itself includes receiving control signaling including a scheduling parameter that indicates a sub sampling rate in frequency of the reference signal, and identifying the at least one time point based on the subsampling rate.

In Example 14, the subject matter of any one of Examples 1 to 13 can optionally further include if the load of the subcarriers is greater than the predefined level, controlling the antenna array to use a single antenna beamforming pattern during the symbol period.

In Example 15, the subject matter of any one of Examples 1 to 14 can optionally include wherein higher values of the load metric indicate lower load of the subcarriers, and wherein lower values of the load metric indicate higher load of the subcarriers.

In Example 16, the subject matter of Example 15 can optionally include wherein comparing the load metric to the load threshold to determine whether the load of the subcarriers is less than the predefined level includes determining that the load of the subcarriers is less than the predefined level if the load metric is greater than the load threshold.

In Example 17, the subject matter of any one of Examples 1 to 14 can optionally include wherein lower values of the load metric indicate lower load of the subcarriers, and wherein higher values of the load metric indicate higher load of the subcarriers.

In Example 18, the subject matter of Example 17 can optionally include wherein comparing the load metric to the load threshold to determine whether the load of the subcarriers is less than the predefined level includes determining that the load of the subcarriers is less than the predefined level if the load metric is less than the load threshold.

Example 20 is a method of performing wireless communications at a wireless device, the method including identifying at least one time point where a reference signal repeats itself during a symbol period, obtaining a first data stream from the reference signal by controlling an antenna array to receive with a first antenna beamforming pattern over the symbol period, obtaining a second data stream from the reference signal by controlling the antenna array to switch among a plurality of antenna beamforming patterns based on the at least one time point, determining, with the first data stream, a load metric based on a load of subcarriers around reference subcarrier signals of the reference signal, and if the load metric indicates the load of the subcarriers is less than a predefined level, determining radio measurements for the plurality of antenna beamforming patterns based on the second data stream.

In Example 20, the subject matter of Example 19 can optionally include wherein identifying the at least one time point where the reference signal repeats itself during the symbol period includes receiving control signaling including a scheduling parameter that indicates a subsampling rate in frequency of the reference signal, and identifying the at least one time point based on the subsampling rate.

In Example 21, the subject matter of Example 19 or 20 can optionally include wherein obtaining the first data stream and the second data stream includes concurrently obtaining the first data stream and the second data stream.

In Example 22, the subject matter of any one of Examples 19 to 21 can optionally include wherein controlling the antenna array to receive with the first antenna beamforming pattern over the symbol period and to switch among the plurality of antenna beamforming patterns based on the at least one time point includes controlling a first set of antenna elements of the antenna array to receive with the first antenna beamforming pattern and controlling a second set of antenna elements of the antenna array to switch among the plurality of antenna beamforming patterns based on the at least one time point.

In Example 23, the subject matter of any one of Examples 19 to 21 can optionally include wherein controlling the antenna array to receive with the first antenna beamforming pattern over the symbol period and to switch among the plurality of antenna beamforming patterns based on the at least one time point includes controlling a first plurality of ports of the antenna array that have a first polarization angle to receive with the first antenna beamforming pattern over the symbol period, and controlling a second plurality of ports of the antenna array that have a second polarization angle to switch among the plurality of antenna beamforming patterns based on the at least one time point.

In Example 24, the subject matter of any one of Examples 19 to 23 can optionally include wherein determining the load metric based on the load of subcarriers around the reference subcarrier signals includes determining the load metric as a ratio of a power of the reference subcarrier signals to a power of the subcarriers around the reference subcarrier signals.

In Example 25, the subject matter of any one of Examples 19 to 24 can optionally include wherein determining the load metric includes determining a reference signal receive quality (RSRQ) measurement.

In Example 26, the subject matter of any one of Examples 19 to 25 can optionally include wherein the second data stream includes a first substream from when the antenna array is set to a second antenna beamforming pattern and further includes a second substream from when the antenna array is set to a third antenna beamforming pattern.

In Example 27, the subject matter of Example 26 can optionally include wherein, if the load metric indicates the load of the subcarriers is less than the predefined level, determining radio measurements for the plurality of antenna beamforming patterns based on the second data stream includes determining a radio measurement for the second antenna beamforming pattern based on the first substream, and determining a radio measurement for the third antenna beamforming pattern based on the second substream.

In Example 28, the subject matter of any one of Examples 19 to 27 can optionally further include selecting an antenna beamforming pattern from the plurality of antenna beamforming patterns based on the radio measurements, and controlling the antenna array to receive signals with the antenna beamforming pattern.

In Example 29, the subject matter of any one of Examples 19 to 28 can optionally include wherein the reference subcarrier signals form a plurality of identical repetitions over time in the symbol period, and wherein controlling the antenna array to switch among the plurality of antenna beamforming patterns based on the at least one time point includes controlling the antenna array to set to a different antenna beamforming pattern during each of the plurality of identical repetitions.

In Example 30, the subject matter of Example 29 can optionally include wherein the at least one time point correspond to starting points or ending points of the plurality of repetitions.

In Example 31, the subject matter of any one of Examples 19 to 30 can optionally include wherein the reference subcarrier signals are evenly spaced in frequency.

In Example 32, the subject matter of any one of Examples 19 to 31 can optionally further include if the load metric indicates the load of the subcarriers is greater than the predefined level, determining a radio measurement for the first antenna beamforming pattern during the symbol period.

In Example 33, the subject matter of any one of Examples 19 to 32 can optionally further include comparing the load metric to a load threshold to determine whether the load metric indicates the load of the subcarriers is less than the predefined level.

In Example 34, the subject matter of Example 33 can optionally include wherein higher values of the load metric indicate lower load of the subcarriers, and wherein lower values of the load metric indicate higher load of the subcarriers.

In Example 35, the subject matter of Example 33 or 34 can optionally include wherein comparing the load metric to the load threshold to determine whether the load of the subcarriers is less than the predefined level includes determining that the load of the subcarriers is less than the predefined level if the load metric is greater than the load threshold.

In Example 36, the subject matter of Example 33 can optionally include wherein lower values of the load metric indicate lower load of the subcarriers, and wherein higher values of the load metric indicate higher load of the subcarriers.

In Example 37, the subject matter of Example 33 or 36 can optionally include wherein comparing the load metric to the load threshold to determine whether the load of the subcarriers is less than the predefined level includes determining that the load of the subcarriers is less than the predefined level if the load metric is less than the load threshold.

Example 38 is a method of performing wireless communications at a wireless device, the method including determining a network traffic metric based on a number of wireless devices connected to the wireless device, if the network traffic metric indicates network traffic is greater than a predefined level, scheduling a plurality of wireless devices to transmit reference signals to the wireless device in a first symbol period, and if the network traffic metric indicates network traffic is less than the predefined level, scheduling a first wireless device to transmit a reference signal to the wireless device in the first symbol period, and controlling an antenna array to receive the reference signal by switching between a plurality of antenna beamforming patterns in the first symbol period.

In Example 39, the subject matter of Example 38 can optionally include wherein the network traffic is a number of wireless devices in a co-located group that are connected to the wireless device.

In Example 40, the subject matter of Example 38 or 39 can optionally further include if the network traffic metric indicates the network traffic is greater than the predefined level, controlling the antenna array to receive the reference signals from the plurality of wireless devices without switching between multiple antenna beamforming patterns in the first symbol period.

In Example 41, the subject matter of Example 40 can optionally include wherein if the network traffic metric indicates the network traffic is greater than the predefined level the method further includes controlling, in one or more subsequent symbol periods, the antenna array to receive reference signals from the plurality of wireless devices with one or more additional antenna beamforming patterns, and selecting antenna beamforming patterns for the plurality of wireless devices based on radio measurements for the one or more additional antenna beamforming patterns.

In Example 42, the subject matter of any one of Examples 38 to 41 can optionally include wherein scheduling the plurality of wireless devices to transmit the reference signals to the wireless device in the first symbol period includes transmitting, to the plurality of wireless devices, reference signal grants that schedule the plurality of wireless devices to transmit respective reference signals on different frequencies in the first symbol period.

In Example 43, the subject matter of any one of Examples 38 to 42 can optionally include wherein scheduling the first wireless device to transmit the reference signal to the wireless device in the first symbol period includes scheduling only the first wireless devices to transmit the reference signal to the wireless device in the first symbol period.

In Example 44, the subject matter of any one of Examples 38 to 43 can optionally include wherein scheduling the first wireless device to transmit the reference signal to the wireless device in the first symbol period includes scheduling uplink transmissions in the first symbol period where all subcarriers other than those carrying the reference signal are empty.

In Example 45, the subject matter of any one of Examples 38 to 44 can optionally further include if the network traffic metric indicates network traffic is less than the predefined level, identifying at least one time point where the reference signal repeats itself in the first symbol period, wherein controlling the antenna array to receive the reference signal by switching between a plurality of antenna beamforming patterns in the first symbol includes controlling the antenna array to switch among the plurality of antenna beamforming patterns based on the at least one time point.

In Example 46, the subject matter of any one of Examples 38 to 45 can optionally include wherein the reference subcarrier signals are evenly spaced in frequency.

In Example 47, the subject matter of any one of Examples 38 to 46 can optionally include wherein identifying the one or time points where the reference signal repeats itself includes receiving control signaling including a scheduling parameter that indicates a sub sampling rate in frequency of the reference signal, and identifying the at least one time point based on the subsampling rate.

In Example 48, the subject matter of any one of Examples 38 to 47 can optionally include wherein if the network traffic metric indicates the network traffic is less than the predefined level, the method further includes before scheduling the first wireless device to transmit the reference signal, determining a mobility metric for the first wireless device based on how much the first wireless device is moving, determining whether the mobility metric indicates device mobility is greater than a predefined level, and if the mobility metric indicates the device mobility is greater than the predefined level, scheduling the first wireless device to transmit the reference signal to the wireless device in the first symbol period and controlling the antenna array to receive the reference signal by switching among the plurality of antenna beamforming patterns in the first symbol period.

In Example 49, the subject matter of Example 48 can optionally further include if the mobility metric indicates the device mobility is less than the predefined level, scheduling the first wireless device and one or more additional wireless devices to transmit reference signals to the wireless device in the first symbol period, and controlling the antenna array to receive the reference signals in the first symbol period with a first antenna beamforming pattern.

In Example 50, the subject matter of any one of Examples 38 to 49 can optionally further include comparing the network traffic metric to a traffic threshold to determine whether the network traffic is greater than the predefined level.

In Example 51, the subject matter of Example 50 can optionally include wherein comparing the network traffic metric to the traffic threshold to determine whether the network traffic is greater than the predefined level includes determining the network traffic is greater than the predefined level if the network traffic metric is greater than the traffic threshold.

In Example 52, the subject matter of Example 50 can optionally include wherein comparing the network traffic metric to the traffic threshold to determine whether the network traffic is greater than the predefined level includes determining the network traffic is greater than the predefined level if the network traffic metric is less than the traffic threshold.

Example 53 is a method of performing wireless communications at a wireless device, the method including identifying a symbol period when the wireless device is scheduled to transmit a reference signal to a second wireless device, identifying at least one time point in the symbol period where the reference signal is scheduled to repeat itself, controlling an antenna array to transmit the reference signal during the symbol period by switching between a plurality of antenna beamforming patterns based on the at least one time point, receiving a report from the second wireless device that identifies a first antenna beamforming pattern of the plurality of antenna beamforming patterns, and controlling the antenna array to transmit a signal to the second wireless device with the first antenna beamforming pattern.

In Example 54, the subject matter of Example 53 can optionally include wherein the wireless device is a network access node, and wherein identifying the symbol period when the wireless device is scheduled to transmit the reference signal to the second wireless device includes determining a downlink transmission schedule for one or more wireless devices connected to the wireless device that schedules the wireless device to transmit the reference signal in the symbol period.

In Example 55, the subject matter of Example 53 can optionally include wherein the wireless devices is a terminal device, and wherein identifying the symbol period when the wireless device is scheduled to transmit the reference signal to the second wireless device includes receiving, from the second wireless device, an uplink reference signal grant that schedules the wireless device to transmit the reference signal in the symbol period.

In Example 56, the subject matter of any one of Examples 53 to 55 can optionally include wherein the reference signal forms a plurality of identical repetitions over time in the symbol period, and wherein the report from the second wireless device identifies the antenna beamforming pattern by identifying a repetition in the symbol period.

In Example 57, the subject matter of any one of Examples 53 to 55 can optionally include wherein the reference signal forms a plurality of identical repetitions over time in the symbol period, and wherein controlling the antenna array to switch among the plurality of antenna beamforming patterns based on the at least one time point includes controlling the antenna array to set to a different antenna beamforming pattern during each of the plurality of identical repetitions.

In Example 58, the subject matter of Example 57 can optionally include wherein the at least one time point correspond to starting points or ending points of the plurality of repetitions.

In Example 59, the subject matter of any one of Examples 53 to 58 can optionally include wherein the reference signal includes a plurality of reference subcarrier signals in the symbol period that are evenly spaced in frequency.

In Example 60, the subject matter of any one of Examples 53 to 59 can optionally include wherein identifying the at least one time point in the symbol period where the reference signal is scheduled to repeat itself includes identifying a scheduling parameter that indicates a subsampling rate in frequency of the reference signal, and identifying the at least one time point based on the subsampling rate.

Example 61 is a wireless device including a digital receiver configured to receive data via an antenna array, and to determine a load metric based on a load of subcarriers around reference subcarrier signals of a reference signal, and a controller configured to compare the load metric to a load threshold to determine whether the load of the subcarriers is less than a predefined level, and if the load of the subcarriers is less than the predefined level, identify at least one time point where the reference signal repeats itself during a symbol period, and control the antenna array to switch among the plurality of antenna beamforming patterns based on the at least one time point.

In Example 62, the subject matter of Example 61 can optionally include wherein the digital receiver is further configured to determine the load metric by receiving the reference signal over a plurality of reference signal instances, determining a plurality of load metrics based on the reference signal in the plurality of reference signal instances, and determining the load metric based on the plurality of load metrics from the digital receiver.

In Example 63, the subject matter of Example 62 can optionally include wherein the digital receiver is configured to determine the load metric based on an average of the plurality of load metrics.

In Example 64, the subject matter of any one of Examples 61 to 63 can optionally include wherein the digital receiver is configured to determine the load metric by determining a ratio of a power of the reference subcarrier signals to a power of the subcarriers around the reference subcarrier signals.

In Example 65, the subject matter of any one of Examples 61 to 64 can optionally include wherein the digital receiver is configured to determine the load metric by determining a reference signal receive quality (RSRQ) measurement.

In Example 66, the subject matter of any one of Examples 61 to 65 can optionally include wherein the digital receiver is configured to receive data from the antenna array for the symbol period, wherein the data includes a first substream from when the antenna array is set to a first antenna beamforming pattern and further includes a second substream from when the antenna array is set to a second antenna beamforming pattern.

In Example 67, the subject matter of Example 66 can optionally include wherein the digital receiver is further configured to obtain a first radio measurement for the first antenna beamforming pattern based on the first substream and to obtain a second radio measurement for the second antenna beamforming pattern based on the second substream.

In Example 68, the subject matter of any one of Examples 61 to 67 can optionally include wherein the digital receiver is further configured to receive data from the antenna array for the symbol period, and to obtain radio measurements for the plurality of antenna beamforming patterns based on the data, and wherein the controller is further configured to select an antenna beamforming pattern from the plurality of antenna beamforming patterns based on the radio measurements.

In Example 69, the subject matter of Example 68 can optionally include wherein the controller is further configured to control the antenna array to receive data with the beamforming pattern.

In Example 70, the subject matter of any one of Examples 61 to 69 can optionally include wherein the reference subcarrier signals form a plurality of identical repetitions over time in the symbol period, and wherein the controller is configured to control the antenna array to set to a different one of the plurality of antenna beamforming patterns during each of the plurality of identical repetitions.

In Example 71, the subject matter of Example 70 can optionally include wherein the at least one time point correspond to starting points or ending points of the plurality of repetitions.

In Example 72, the subject matter of any one of Examples 61 to 71 can optionally include wherein the reference subcarrier signals are evenly spaced in frequency.

In Example 73, the subject matter of any one of Examples 61 to 72 can optionally include wherein the controller is configured to identify the one or time points where the reference signal repeats itself by receiving control signaling including a scheduling parameter that indicates a subsampling rate in frequency of the reference signal, and identifying the at least one time point based on the subsampling rate.

In Example 74, the subject matter of any one of Examples 61 to 73 can optionally include wherein the controller is further configured to, if the load of the subcarriers is greater than the predefined level, control the antenna array to use a single antenna beamforming pattern during the symbol period.

In Example 75, the subject matter of any one of Examples 61 to 74 can optionally include wherein higher values of the load metric indicate lower load of the subcarriers, and wherein lower values of the load metric indicate higher load of the subcarriers.

The wireless device of Example 75, wherein the controller is configured to compare the load metric to the load threshold to determine whether the load of the subcarriers is less than the predefined level by determining that the load of the subcarriers is less than the predefined level if the load metric is greater than the load threshold.

In Example 77, the subject matter of any one of Examples 61 to 74 can optionally include wherein lower values of the load metric indicate lower load of the subcarriers, and wherein higher values of the load metric indicate higher load of the subcarriers.

In Example 78, the subject matter of Example 77 can optionally include wherein the controller is configured to compare the load metric to the load threshold to determine whether the load of the subcarriers is less than the predefined level by determining that the load of the subcarriers is less than the predefined level if the load metric is less than the load threshold.

In Example 79, the subject matter of any one of Examples 61 to 78 can optionally further include the antenna array and a radio frequency transceiver.

Example 80 is a wireless device including a controller configured to identify at least one time point where a reference signal repeats itself during a symbol period, and to control an antenna array to receive with different antenna beamforming patterns, a digital receiver configured to obtain a first data stream from the reference signal when the controller controls the antenna array to receive with a first antenna beamforming pattern over the symbol period, and to obtain a second data stream from the reference signal when the controller controls the antenna array to switch among a plurality of antenna beamforming patterns based on the at least one time point, and determine, with the first data stream, a load metric based on a load of subcarriers around reference subcarrier signals of the reference signal, wherein the controller is further configured to if the load metric indicates the load of the subcarriers is less than a predefined level, control the digital receiver to obtain radio measurements for the plurality of antenna beamforming patterns based on the second data stream.

In Example 81, the subject matter of Example 80 can optionally include wherein the controller is configured to identify the at least one time point where the reference signal repeats itself during the symbol period by receiving control signaling including a scheduling parameter that indicates a subsampling rate in frequency of the reference signal, and identifying the at least one time point based on the subsampling rate.

In Example 82, the subject matter of Example 80 or 81 can optionally include wherein the digital receiver is configured to concurrently receive the first data stream and the second data stream.

In Example 83, the subject matter of any one of Examples 80 to 82 can optionally include wherein the controller is configured to control the antenna array to receive with the first antenna beamforming pattern over the symbol period and to switch among the plurality of antenna beamforming patterns based on the at least one time point by controlling a first set of antenna elements of the antenna array to receive with the first antenna beamforming pattern and controlling a second set of antenna elements of the antenna array to switch among the plurality of antenna beamforming patterns based on the at least one time point.

In Example 84, the subject matter of any one of Examples 80 to 82 can optionally include wherein the controller is configured to control the antenna array to receive with the first antenna beamforming pattern over the symbol period and to switch among the plurality of antenna beamforming patterns based on the at least one time point by controlling a first plurality of ports of the antenna array that have a first polarization angle to receive with the first antenna beamforming pattern over the symbol period, and controlling a second plurality of ports of the antenna array that have a second polarization angle to switch among the plurality of antenna beamforming patterns based on the at least one time point.

In Example 85, the subject matter of any one of Examples 80 to 84 can optionally include wherein the digital receiver is configured to determine the load metric based on the load of subcarriers around the reference subcarrier signals by determining the load metric as a ratio of a power of the reference subcarrier signals to a power of the subcarriers around the reference subcarrier signals.

In Example 86, the subject matter of any one of Examples 80 to 85 can optionally include wherein the digital receiver is configured to determine the load metric by determining a reference signal receive quality (RSRQ) measurement.

In Example 87, the subject matter of any one of Examples 80 to 86 can optionally include wherein the second data stream includes a first substream from when the antenna array is set to a second antenna beamforming pattern and further includes a second substream from when the antenna array is set to a third antenna beamforming pattern.

In Example 88, the subject matter of Example 87 can optionally include wherein, if the load metric indicates the load of the subcarriers is less than the predefined level, the digital receiver is configured to determine radio measurements for the plurality of antenna beamforming patterns based on the second data stream by determining a radio measurement for the second antenna beamforming pattern based on the first substream, and determining a radio measurement for the third antenna beamforming pattern based on the second substream.

In Example 89, the subject matter of any one of Examples 80 to 88 can optionally include wherein the controller is further configured to select an antenna beamforming pattern from the plurality of antenna beamforming patterns based on the radio measurements, and control the antenna array to receive signals with the antenna beamforming pattern.

In Example 90, the subject matter of any one of Examples 80 to 89 can optionally include wherein the reference subcarrier signals form a plurality of identical repetitions over time in the symbol period, and wherein the controller is configured to control the antenna array to switch among the plurality of antenna beamforming patterns based on the at least one time point by controlling the antenna array to set to a different antenna beamforming pattern during each of the plurality of identical repetitions.

In Example 91, the subject matter of Example 90 can optionally include wherein the at least one time point correspond to starting points or ending points of the plurality of repetitions.

In Example 92, the subject matter of any one of Examples 80 to 91 can optionally include wherein the reference subcarrier signals are evenly spaced in frequency.

In Example 93, the subject matter of any one of Examples 80 to 92 can optionally include wherein the controller is further configured to if the load metric indicates the load of the subcarriers is greater than the predefined level, control the digital receiver to determine a radio measurement for the first antenna beamforming pattern during the symbol period.

In Example 94, the subject matter of any one of Examples 80 to 93 can optionally include wherein the controller is further configured to compare the load metric to a load threshold to determine whether the load metric indicates the load of the subcarriers is less than the predefined level.

In Example 95, the subject matter of Example 94 can optionally include wherein higher values of the load metric indicate lower load of the subcarriers, and wherein lower values of the load metric indicate higher load of the subcarriers.

In Example 96, the subject matter of Example 94 or 95 can optionally include wherein the controller is configured to compare the load metric to the load threshold to determine whether the load of the subcarriers is less than the predefined level by determining that the load of the subcarriers is less than the predefined level if the load metric is greater than the load threshold.

In Example 97, the subject matter of Example 94 can optionally include wherein lower values of the load metric indicate lower load of the subcarriers, and wherein higher values of the load metric indicate higher load of the subcarriers.

In Example 98, the subject matter of Example 94 or 97 can optionally include wherein the controller is configured to compare the load metric to the load threshold to determine whether the load of the subcarriers is less than the predefined level by determining that the load of the subcarriers is less than the predefined level if the load metric is less than the load threshold.

In Example 99, the subject matter of any one of Examples 80 to 98 can optionally further include the antenna array.

Example 100 is a wireless device including a digital receiver configured to receive data via an antenna array, and a controller configured to determine a network traffic metric based on a number of wireless devices connected to the wireless device, if the network traffic metric indicates network traffic is greater than a predefined level, schedule a plurality of wireless devices to transmit reference signals to the wireless device in a first symbol period, and if the network traffic metric indicates network traffic is less than the predefined level, schedule a first wireless device to transmit a reference signal to the wireless device in the first symbol period, and control the antenna array to receive the reference signal by switching between a plurality of antenna beamforming patterns in the first symbol period.

In Example 101, the subject matter of Example 100 can optionally include wherein the network traffic is a number of wireless devices in a co-located group that are connected to the wireless device.

In Example 102, the subject matter of Example 100 or 101 can optionally include wherein the controller is further configured to if the network traffic metric indicates the network traffic is greater than the predefined level, control the antenna array to receive the reference signals from the plurality of wireless devices without switching between multiple antenna beamforming patterns in the first symbol period.

In Example 103, the subject matter of Example 102 can optionally include wherein the controller is further configured to, if the network traffic metric indicates the network traffic is greater than the predefined level control, in one or more subsequent symbol periods, the antenna array to receive reference signals from the plurality of wireless devices with one or more additional antenna beamforming pattern, and select antenna beamforming patterns for the plurality of wireless devices based on radio measurements for the one or more additional antenna beamforming patterns.

In Example 104, the subject matter of Example 103 can optionally include wherein the digital receiver is configured to perform the radio measurements.

In Example 105, the subject matter of any one of Examples 100 to 104 can optionally include wherein the controller is configured to schedule the plurality of wireless devices to transmit the reference signals to the wireless device in the first symbol period by transmitting, to the plurality of wireless devices, reference signal grants that schedule the plurality of wireless devices to transmit respective reference signals on different frequencies in the first symbol period.

In Example 106, the subject matter of any one of Examples 100 to 105 can optionally include wherein the controller is configured to schedule the first wireless device to transmit the reference signal to the wireless device in the first symbol period by scheduling only the first wireless devices to transmit the reference signal to the wireless device in the first symbol period.

In Example 107, the subject matter of any one of Examples 100 to 106 can optionally include wherein the controller is configured to schedule the first wireless device to transmit the reference signal to the wireless device in the first symbol period by scheduling uplink transmissions in the first symbol period where all subcarriers other than those carrying the reference signal are empty.

In Example 108, the subject matter of any one of Examples 100 to 107 can optionally include wherein the controller is further configured to, if the network traffic metric indicates the network traffic is less than the predefined level, identify at least one time point where the reference signal repeats itself in the first symbol period, and wherein the controller is configured to control the antenna array to receive the reference signal by switching between a plurality of antenna beamforming patterns in the first symbol by controlling the antenna array to switch among the plurality of antenna beamforming patterns based on the at least one time point.

In Example 109, the subject matter of any one of Examples 100 to 108 can optionally include wherein the reference subcarrier signals are evenly spaced in frequency.

In Example 110, the subject matter of any one of Examples 100 to 109 can optionally include wherein the controller is configured to identify the one or time points where the reference signal repeats itself by receiving control signaling including a scheduling parameter that indicates a subsampling rate in frequency of the reference signal, and identifying the at least one time point based on the subsampling rate.

In Example 111, the subject matter of any one of Examples 100 to 110 can optionally include wherein, if the network traffic metric indicates network traffic is less than the predefined level, the controller is further configured to before scheduling the first wireless device to transmit the reference signal, determine a mobility metric for the first wireless device based on how much the first wireless device is moving, determine whether the mobility metric indicates device mobility is greater than a predefined level, and if the mobility metric indicates the device mobility is greater than the predefined level, schedule the first wireless device to transmit the reference signal to the wireless device in the first symbol period and control the antenna array to receive the reference signal by switching among the plurality of antenna beamforming patterns in the first symbol period.

In Example 112, the subject matter of Example 111 can optionally include wherein the controller is further configured to if the mobility metric indicates the device mobility is less than the predefined level, schedule the first wireless device and one or more additional wireless devices to transmit reference signals to the wireless device in the first symbol period, and controlling the antenna array to receive the reference signals in the first symbol period with a first antenna beamforming pattern.

In Example 113, the subject matter of any one of Examples 100 to 111 can optionally include wherein the controller is further configured to compare the network traffic metric to a traffic threshold to determine whether the network traffic is greater than the predefined level.

In Example 114, the subject matter of Example 113 can optionally include wherein the controller is configured to determine the network traffic is greater than the predefined level if the network traffic metric is greater than the traffic threshold.

In Example 115, the subject matter of Example 113 can optionally include wherein the controller is configured to determine the network traffic is greater than the predefined level if the network traffic metric is less than the traffic threshold.

In Example 116, the subject matter of any one of Examples 100 to 112 can optionally further include the antenna array.

Example 117 is a wireless device including a controller configured to identify a symbol period when the wireless device is scheduled to transmit a reference signal to a second wireless device, identify at least one time point in the symbol period where the reference signal is scheduled to repeat itself, control an antenna array to transmit the reference signal during the symbol period by switching between a plurality of antenna beamforming patterns based on the at least one time point, receive a report from the second wireless device that identifies a first antenna beamforming pattern of the plurality of antenna beamforming patterns, and control the antenna array to transmit a signal to the second wireless device with the first antenna beamforming pattern.

In Example 118, the subject matter of Example 114 can optionally include wherein the wireless device is a network access node, and wherein the controller is configured to identify the symbol period when the wireless device is scheduled to transmit the reference signal to the second wireless device by determining a downlink transmission schedule for one or more wireless devices connected to the wireless device that schedules the wireless device to transmit the reference signal in the symbol period.

In Example 119, the subject matter of Example 114 can optionally include wherein the wireless devices is a terminal device, and wherein the controller is configured to identify the symbol period when the wireless device is scheduled to transmit the reference signal to the second wireless device by receiving, from the second wireless device, an uplink reference signal grant that schedules the wireless device to transmit the reference signal in the symbol period.

In Example 120, the subject matter of any one of Examples 114 to 116 can optionally include wherein the reference signal forms a plurality of identical repetitions over time in the symbol period, and wherein the report from the second wireless device identifies the antenna beamforming pattern by identifying a repetition in the symbol period.

In Example 121, the subject matter of any one of Examples 114 to 116 can optionally include wherein the reference signal forms a plurality of identical repetitions over time in the symbol period, and wherein controlling the antenna array to switch among the plurality of antenna beamforming patterns based on the at least one time point includes controlling the antenna array to set to a different antenna beamforming pattern during each of the plurality of identical repetitions.

In Example 122, the subject matter of Example 118 can optionally include wherein the at least one time point correspond to starting points or ending points of the plurality of repetitions.

In Example 123, the subject matter of any one of Examples 114 to 119 can optionally include wherein the reference signal includes a plurality of reference subcarrier signals in the symbol period that are evenly spaced in frequency.

In Example 124, the subject matter of any one of Examples 114 to 120 can optionally include wherein the controller is configured to identify the at least one time point in the symbol period where the reference signal is scheduled to repeat itself by identifying a scheduling parameter that indicates a subsampling rate in frequency of the reference signal, and identifying the at least one time point based on the subsampling rate.

In Example 125, the subject matter of any one of Examples 114 to 121 can optionally further include the antenna array.

Example 126 is a non-transitory computer readable medium storing instructions that, when executed by one or more processors of a wireless device, cause the wireless device to perform the method of any one of Examples 1 to 60.

Example 127 is a wireless device including one or more processors, and a memory storing instructions that, when executed by the one or more processors, cause the wireless device to perform the method of any one of Examples 1 to 60.

Example 128 is a wireless device including means for determining a load metric based on a load of subcarriers around reference subcarrier signals of a reference signal, means for comparing the load metric to a load threshold to determine whether the load of the subcarrier is less than a predefined level, and means for, if the load of the subcarriers is less than the predefined level, identifying at least one time point where the reference signal repeats itself during a symbol period, and controlling an antenna array to switch among the plurality of antenna beamforming patterns based on the at least one time point.

Example 129 is a wireless device including means for identifying at least one time point where a reference signal repeats itself during a symbol period, means for obtaining a first data stream from the reference signal by controlling an antenna array to receive with a first antenna beamforming pattern over the symbol period, means for obtaining a second data stream from the reference signal by controlling the antenna array to switch among a plurality of antenna beamforming patterns based on the at least one time point, means for determining, with the first data stream, a load metric based on a load of subcarriers around reference subcarrier signals of the reference signal, and means for, if the load metric indicates the load of the subcarriers is less than a predefined level, determining radio measurements for the plurality of antenna beamforming patterns based on the second data stream.

Example 130 is a wireless device including means for determining a network traffic metric based on a number of wireless devices connected to the wireless device, means for, if the network traffic metric indicates network traffic is greater than a predefined level, scheduling a plurality of wireless devices to transmit reference signals to the wireless device in a first symbol period, and means for, if the network traffic metric indicates network traffic is less than the predefined level, scheduling a first wireless device to transmit a reference signal to the wireless device in the first symbol period, and controlling an antenna array to receive the reference signal by switching between a plurality of antenna beamforming patterns in the first symbol period.

Example 131 is a wireless device including means for identifying a symbol period when the wireless device is scheduled to transmit a reference signal to a second wireless device, means for identifying at least one time point in the symbol period where the reference signal is scheduled to repeat itself, means for controlling an antenna array to transmit the reference signal during the symbol period by switching between a plurality of antenna beamforming patterns based on the at least one time point, means for receiving a report from the second wireless device that identifies a first antenna beamforming pattern of the plurality of antenna beamforming patterns, and means for controlling the antenna array to transmit a signal to the second wireless device with the first antenna beamforming pattern.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless device comprising:
a digital receiver configured to receive data via an antenna array, and to determine a load metric based on a load of subcarriers around reference subcarrier signals of a reference signal; and
a controller configured to:
compare the load metric to a load threshold to determine whether the load of the subcarriers is less than a predefined level, and
if the load of the subcarriers is less than the predefined level, identify at least one time point where the reference signal repeats itself during a symbol period, and control the antenna array to switch among the plurality of antenna beamforming patterns based on the at least one time point.

2. The wireless device of claim 1, wherein the digital receiver is configured to determine the load metric by determining a ratio of a power of the reference subcarrier signals to a power of the subcarriers around the reference subcarrier signals.

3. The wireless device of claim 1, wherein the digital receiver is configured to receive data from the antenna array for the symbol period, wherein the data comprises a first substream from when the antenna array is set to a first antenna beamforming pattern and further comprises a second substream from when the antenna array is set to a second antenna beamforming pattern.

4. The wireless device of claim 3, wherein the digital receiver is further configured to obtain a first radio measurement for the first antenna beamforming pattern based on the first substream and to obtain a second radio measurement for the second antenna beamforming pattern based on the second substream.

5. The wireless device of claim 1, wherein the digital receiver is further configured to receive data from the antenna array for the symbol period, and to obtain radio measurements for the plurality of antenna beamforming patterns based on the data,
and wherein the controller is further configured to select an antenna beamforming pattern from the plurality of antenna beamforming patterns based on the radio measurements.

6. The wireless device of claim 5, wherein the controller is further configured to control the antenna array to receive data with the beamforming pattern.

7. The wireless device of claim 1, wherein the controller is further configured to, if the load of the subcarriers is greater than the predefined level, control the antenna array to use a single antenna beamforming pattern during the symbol period.

8. The wireless device of claim 1, further comprising the antenna array and a radio frequency transceiver.

9. A wireless device comprising:
a controller configured to identify at least one time point where a reference signal repeats itself during a symbol period, and to control an antenna array to receive with different antenna beamforming patterns;
a digital receiver configured to:
obtain a first data stream from the reference signal when the controller controls the antenna array to receive with a first antenna beamforming pattern over the symbol period, and to obtain a second data stream from the reference signal when the controller controls the antenna array to switch among a plurality of antenna beamforming patterns based on the at least one time point, and
determine, with the first data stream, a load metric based on a load of subcarriers around reference subcarrier signals of the reference signal,
wherein the controller is further configured to:
if the load metric indicates the load of the subcarriers is less than a predefined level, control the digital receiver to obtain radio measurements for the plurality of antenna beamforming patterns based on the second data stream.

10. The wireless device of claim 9, wherein the digital receiver is configured to concurrently receive the first data stream and the second data stream.

11. The wireless device of claim 9, wherein the digital receiver is configured to determine the load metric based on the load of subcarriers around the reference subcarrier signals by:
determining the load metric as a ratio of a power of the reference subcarrier signals to a power of the subcarriers around the reference subcarrier signals.

12. The wireless device of claim 9, wherein the second data stream comprises a first substream from when the antenna array is set to a second antenna beamforming pattern and further comprises a second substream from when the antenna array is set to a third antenna beamforming pattern.

13. The wireless device of claim 12, wherein, if the load metric indicates the load of the subcarriers is less than the predefined level, the digital receiver is configured to determine radio measurements for the plurality of antenna beamforming patterns based on the second data stream by:
determining a radio measurement for the second antenna beamforming pattern based on the first substream, and
determining a radio measurement for the third antenna beamforming pattern based on the second substream.

14. The wireless device of claim 9, wherein the controller is further configured to:
select an antenna beamforming pattern from the plurality of antenna beamforming patterns based on the radio measurements; and control the antenna array to receive signals with the antenna beamforming pattern.

15. The wireless device of claim 9, wherein the controller is further configured to:
if the load metric indicates the load of the subcarriers is greater than the predefined level, control the digital receiver to determine a radio measurement for the first antenna beamforming pattern during the symbol period.

16. The wireless device of claim 9, wherein the controller is further configured to:
compare the load metric to a load threshold to determine whether the load metric indicates the load of the subcarriers is less than the predefined level.

17. A wireless device comprising:
a digital receiver configured to receive data via an antenna array; and
a controller configured to:
determine a network traffic metric based on a number of wireless devices connected to the wireless device;
if the network traffic metric indicates network traffic is greater than a predefined level, schedule a plurality of wireless devices to transmit reference signals to the wireless device in a first symbol period; and
if the network traffic metric indicates network traffic is less than the predefined level, schedule a first wireless device to transmit a reference signal to the wireless device in the first symbol period, and control the antenna array to receive the reference signal by switching between a plurality of antenna beamforming patterns in the first symbol period.

18. The wireless device of claim 17, wherein the controller is further configured to:
if the network traffic metric indicates the network traffic is greater than the predefined level, control the antenna array to receive the reference signals from the plurality of wireless devices without switching between multiple antenna beamforming patterns in the first symbol period.

19. The wireless device of claim 17, wherein the controller is further configured to, if the network traffic metric indicates the network traffic is less than the predefined level, identify at least one time point where the reference signal repeats itself in the first symbol period,
and wherein the controller is configured to control the antenna array to receive the reference signal by switching between a plurality of antenna beamforming patterns in the first symbol by:
controlling the antenna array to switch among the plurality of antenna beamforming patterns based on the at least one time point.

20. The wireless device of claim 17, wherein, if the network traffic metric indicates network traffic is less than the predefined level, the controller is further configured to:
before scheduling the first wireless device to transmit the reference signal, determine a mobility metric for the first wireless device based on how much the first wireless device is moving;
determine whether the mobility metric indicates device mobility is greater than a predefined level; and
if the mobility metric indicates the device mobility is greater than the predefined level, schedule the first wireless device to transmit the reference signal to the wireless device in the first symbol period and control the antenna array to receive the reference signal by switching among the plurality of antenna beamforming patterns in the first symbol period.

21. The wireless device of claim 17, wherein the controller is further configured to:
compare the network traffic metric to a traffic threshold to determine whether the network traffic is greater than the predefined level.

22. A wireless device comprising:
a controller configured to:
identify a symbol period when the wireless device is scheduled to transmit a reference signal to a second wireless device;
identify at least one time point in the symbol period where the reference signal is scheduled to repeat itself;
control an antenna array to transmit the reference signal during the symbol period by switching between a plurality of antenna beamforming patterns based on the at least one time point;
receive a report from the second wireless device that identifies a first antenna beamforming pattern of the plurality of antenna beamforming patterns; and
control the antenna array to transmit a signal to the second wireless device with the first antenna beamforming pattern.

23. The wireless device of claim 22, wherein the wireless device is a network access node, and wherein the controller is configured to identify the symbol period when the wireless device is scheduled to transmit the reference signal to the second wireless device by:
determining a downlink transmission schedule for one or more wireless devices connected to the wireless device that schedules the wireless device to transmit the reference signal in the symbol period.

24. The wireless device of claim 22, wherein the wireless devices is a terminal device, and wherein the controller is configured to identify the symbol period when the wireless device is scheduled to transmit the reference signal to the second wireless device by:
receiving, from the second wireless device, an uplink reference signal grant that schedules the wireless device to transmit the reference signal in the symbol period.

25. The wireless device of claim 22, wherein the reference signal forms a plurality of identical repetitions over time in the symbol period,
and wherein the report from the second wireless device identifies the antenna beamforming pattern by identifying a repetition in the symbol period.

* * * * *